US011827219B2

(12) United States Patent
Tashiro et al.

(10) Patent No.: US 11,827,219 B2
(45) Date of Patent: Nov. 28, 2023

(54) MOTION CONTROL DEVICE FOR MOVING BODY

(71) Applicant: Hitachi Automotive Systems, Ltd., Hitachinaka (JP)

(72) Inventors: Naoyuki Tashiro, Ibaraki (JP); Takashi Okada, Ibaraki (JP)

(73) Assignee: Hitachi Astemo, Ltd., Hitachinaka (JP)

(*) Notice: Subject to any disclaimer, the term of this patent is extended or adjusted under 35 U.S.C. 154(b) by 160 days.

(21) Appl. No.: 16/638,040

(22) PCT Filed: Jul. 5, 2018

(86) PCT No.: PCT/JP2018/025460
§ 371 (c)(1),
(2) Date: Feb. 10, 2020

(87) PCT Pub. No.: WO2019/039105
PCT Pub. Date: Feb. 28, 2019

(65) Prior Publication Data
US 2020/0216068 A1 Jul. 9, 2020

(30) Foreign Application Priority Data
Aug. 25, 2017 (JP) .................. 2017-162507

(51) Int. Cl.
*B60W 30/16* (2020.01)
*B60W 30/14* (2006.01)
(Continued)

(52) U.S. Cl.
CPC .......... *B60W 30/16* (2013.01); *B60W 30/146* (2013.01); *B60W 40/04* (2013.01); *B60W 50/14* (2013.01)

(58) Field of Classification Search
CPC combination set(s) only.
See application file for complete search history.

(56) References Cited

U.S. PATENT DOCUMENTS

| 2009/0321165 A1* | 12/2009 | Haug | B60W 20/00 180/65.21 |
| 2010/0324795 A1* | 12/2010 | Tsumori | B60W 10/08 701/70 |

(Continued)

FOREIGN PATENT DOCUMENTS

| JP | 2004-108777 A | 4/2004 |
| JP | 2008-146377 A | 6/2008 |

(Continued)

OTHER PUBLICATIONS

International Search Report (PCT/ISA/210) issued in PCT Application No. PCT/JP2018/025460 dated Oct. 23, 2018 with English translation (three (3) pages).

(Continued)

*Primary Examiner* — Nicholas Kiswanto
*Assistant Examiner* — Madison B Emmett
(74) *Attorney, Agent, or Firm* — Crowell & Moring LLP

(57) ABSTRACT

A motion control device for a moving body is configured to control a motion of a moving body and includes a movement distance acquisition unit, a movement distance storage unit, a movement distance prediction unit, a control determination unit, and an acceleration/deceleration control unit. The acceleration/deceleration control unit performs control of the acceleration/deceleration in the movement direction of the moving body based on a determination result on whether to suppress the acceleration/deceleration of the moving body performed by the control determination unit and the second movement distance predicted by the movement distance prediction unit.

13 Claims, 15 Drawing Sheets

(51) Int. Cl.
*B60W 40/04* (2006.01)
*B60W 50/14* (2020.01)

(56) References Cited

U.S. PATENT DOCUMENTS

| | | | | |
|---|---|---|---|---|
| 2014/0052357 A1* | 2/2014 | Moebus | ............ | B60W 50/0097 |
| | | | | 701/70 |
| 2014/0330479 A1* | 11/2014 | Dolgov | ................. | G01S 13/931 |
| | | | | 701/28 |
| 2014/0336898 A1* | 11/2014 | Schwindt | ........... | B60K 31/0008 |
| | | | | 701/96 |
| 2015/0066327 A1* | 3/2015 | Syed | ................... | B60W 30/143 |
| | | | | 701/93 |
| 2016/0153374 A1* | 6/2016 | Tashiro | ............... | F02D 41/0002 |
| | | | | 701/103 |
| 2017/0066449 A1* | 3/2017 | Lee | ........................ | B60G 17/02 |
| 2017/0327113 A1* | 11/2017 | Yamakado | ........ | B60W 50/0097 |
| 2018/0236995 A1* | 8/2018 | Iwamoto | ............... | B60W 10/02 |
| 2020/0148227 A1* | 5/2020 | Takemura | ........... | B60W 50/085 |

FOREIGN PATENT DOCUMENTS

| | | |
|---|---|---|
| JP | 2010-143304 A | 7/2010 |
| JP | 2013-164865 A | 8/2013 |
| JP | 2016-203661 A | 12/2016 |

OTHER PUBLICATIONS

Japanese-language Written Opinion (PCT/ISA/237) issued in PCT Application No. PCT/JP2018/025460 dated Oct. 23, 2018 (five (5) pages).

* cited by examiner

MOTION CONTROL DEVICE FOR MOVING BODY

TECHNICAL FIELD

The present invention relates to a motion control device for a moving body.

BACKGROUND ART

In recent years, there is disclosed an automatic driving technique that recognizes a preceding vehicle with a camera or the like and automatically controls acceleration/deceleration of a vehicle so as to maintain a constant distance with the preceding vehicle.

As this kind of automatic driving technique, a technique, which improves fuel consumption of a vehicle by performing inertia deceleration (hereinafter sometimes referred to as acceleration/deceleration suppression control) that suppresses useless acceleration and decelerates by so-called engine brake when a stop position of the vehicle is detected, is disclosed (PTL 1).

In addition, a technique, which informs a driver of a start timing of inertia deceleration to achieve a preset vehicle speed based on a speed limit, a branch point (intersection) set in a travel route of a vehicle, a relative position with a preceding vehicle, and the like, is disclosed (PTL 2).

CITATION LIST

Patent Literature

PTL 1: JP 2008-146377 A
PTL 2: JP 2016-203661 A

SUMMARY OF INVENTION

Technical Problem

In the technique disclosed in PTL 1, position information (static information) of a predetermined stop line is acquired from, for example, map information or the like, and the acceleration/deceleration suppression control of the vehicle is performed based on the position information of the stop line.

However, a stop position of a host vehicle (a dotted line in FIG. 1) is not always in the vicinity of the stop line when a plurality of preceding vehicles (A to E) are stopped between the vehicle and the stop line as illustrated in FIG. 1. For this reason, it is difficult to effectively perform the acceleration/deceleration suppression control of the vehicle, and it is difficult to improve the fuel consumption of the vehicle.

In addition, in the technique disclosed in PTL 2, acceleration/deceleration suppression control is performed based on the speed limit of the travel route of the vehicle and information on a relative position with respect to the preceding vehicle. However, the vehicle speed is determined based on the speed limit of the travel route of the vehicle and the relative position with respect to the preceding vehicle, and thus, a deceleration (stop) position is greatly affected by a vehicle speed variation of the preceding vehicle. In particular, there is a possibility that the host vehicle is decelerated or stopped at a position other than the stop line or the like in a situation where the degree of congestion on a road is large. For this reason, it is difficult to effectively perform the acceleration/deceleration suppression control of the vehicle, and it is difficult to improve the fuel consumption of the vehicle.

Therefore, the present invention has been made by paying attention to the above problems, and an object thereof is to improve fuel consumption of a vehicle by effectively performing acceleration/deceleration suppression control of a moving body such as a vehicle.

Solution to Problem

In order to solve the above problems, a motion control device, configured to control a motion of a moving object, includes: a movement distance acquisition unit which acquires a first movement distance of the moving body from a first motion state to the next first motion state of the moving body; a movement distance storage unit which stores the first movement distance; a movement distance prediction unit which predicts a second movement distance of the moving body from the first motion state to the next first motion state of the moving body after having moved by the first movement distance based on the first movement distance stored in the movement distance storage unit; a control determination unit which determines whether to perform control to suppress acceleration/deceleration in a movement direction of the moving body; and an acceleration/deceleration control unit which controls acceleration/deceleration of the moving body. The acceleration/deceleration control unit is configured to perform control of the acceleration/deceleration in the movement direction of the moving body based on a determination result on whether to suppress the acceleration/deceleration of the moving body performed by the control determination unit and the second movement distance predicted by the movement distance prediction unit.

Advantageous Effects of Invention

According to the present invention, the fuel consumption of the vehicle can be improved by effectively performing the acceleration/deceleration suppression control of the moving body such as a vehicle.

DESCRIPTION OF EMBODIMENTS

Hereinafter, a motion control device for a moving body according to embodiments of the present invention will be described.

In the following description, a case where a motion control device for a moving body is used as a motion control device 1 for a vehicle will be described as an example.

Figure 1:
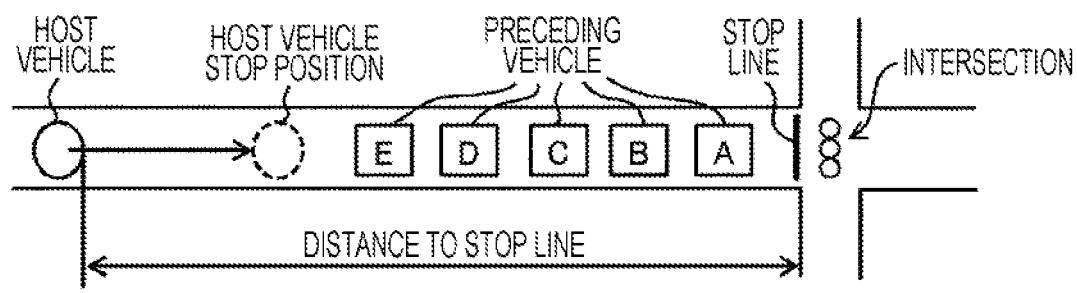
FIG. 1 is a view for describing conventional acceleration/deceleration suppression control.
Figure 2:
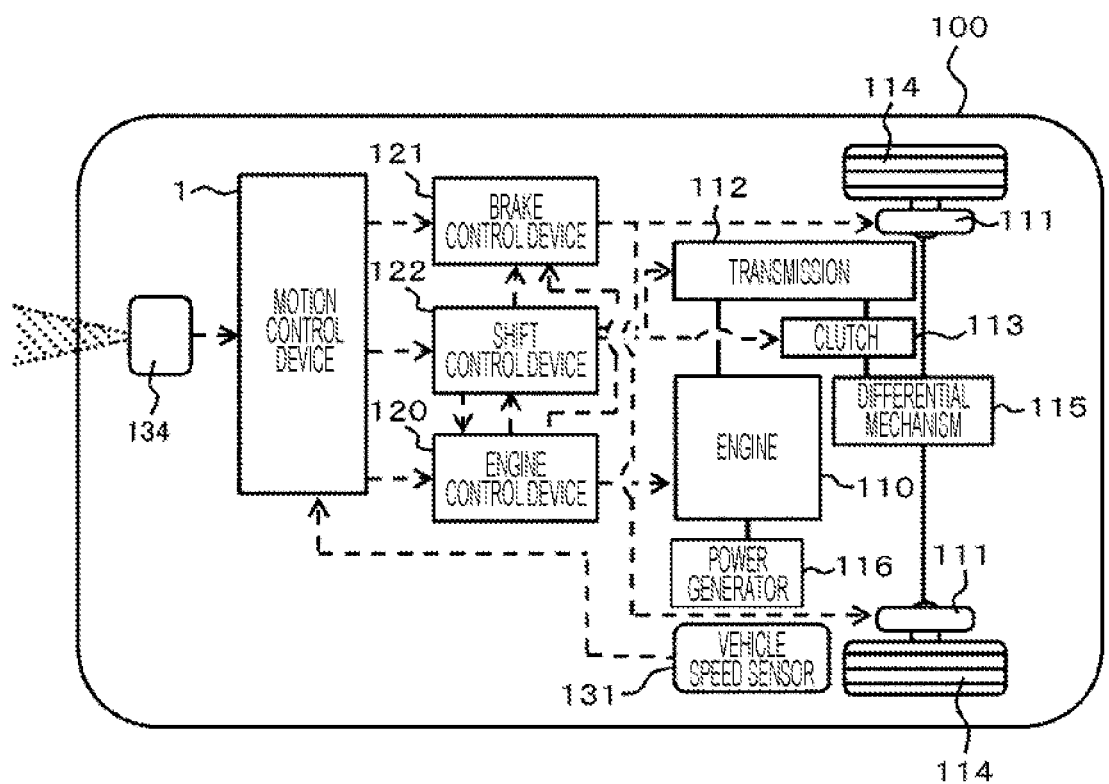
FIG. 2 is a block diagram for describing a vehicle equipped with a motion control device according to a first embodiment.

FIG. 2 is a block diagram illustrating a vehicle 100 equipped with the motion control device 1 according to a first embodiment.

In the following description, the vehicle 100 is sometimes referred to as a host vehicle.

[Overall Configuration of Vehicle According to First Embodiment]

The vehicle 100 includes: an engine 110 that is a power source; a brake 111 that brakes the vehicle 100; a transmission 112 that shifts a driving force generated by the engine 110 to an appropriate speed; a clutch 113 that transmits a driving force between the transmission 112 and wheels 114; an engine control device 120 that controls a throttle body (not illustrated), a fuel injection device, and an ignition device with which the engine 110 generates a desired driving force; a brake control device 121 that adjusts a braking force of the vehicle 100 generated by the brake 111 by controlling a hydraulic pressure of the brake 111; a shift control device 122 that adjusts a speed ratio of the transmission 112 and controls power transmission of the clutch 113; a forward recognition sensor 134 that detects an object ahead of the vehicle 100; a vehicle speed sensor 131 that detects a vehicle speed of the vehicle 100; and the motion control device 1 that commands an operation to the engine control device 120, the brake control device 121, and the shift control device 122.

The engine 110 is powered by chemical energy of fuel by burning the fuel such as gasoline. The power generated by the engine 110 is transmitted to the transmission 112, is shifted by a winding transmission mechanism in the transmission 112, and then, rotates the left and right wheels 114 via the clutch 113 and a differential mechanism 115. The vehicle 100 travels by rotational forces of the wheels 114.

The brake 111 that applies the braking force to the vehicle is provided in the vicinity of the wheel 114. The brake 111 has a brake disc (not illustrated) that rotates together with the wheel 113. A friction body (not illustrated) is pressed against a sliding surface of the brake disc to convert the rotational force of the brake disc into frictional heat and convert kinetic energy into thermal energy, thereby generating the braking force. The brake 111 can brake the vehicle 100 with this operation.

The engine control device 120 includes: a calculation device (not illustrated) that executes various programs necessary to control the engine 110; a primary storage device (not illustrated) that holds a calculation process and a calculation result; and a secondary storage device (not illustrated) that stores the program itself and various control constants. The engine control device 120 transmits a command for control of the engine 110 to a throttle body (not illustrated), a fuel injection valve (not illustrated), and an ignition device (not illustrated) attached to the engine 110.

In addition, the engine control device 120 includes: an I/O ports (not illustrated) that can communicate with various control devices including the motion control device 1; and an A/D converter (not illustrated) that takes a vehicle speed measured by the vehicle speed sensor 131, a measurement value of an air flow meter (not illustrated) which measures the amount of air taken into the engine 110, and the like.

The engine control device 120 executes a program to change an intake air amount and a fuel injection amount so as to make the engine 110 generate a desired driving force. The engine 110 converts chemical energy of fuel into thermal energy by combustion. Since air taken into the engine 110 is expanded to convert a force pushing down a piston (not illustrated) due to such a pressure into a rotational force by a crank mechanism (not illustrated) and the intake air amount and the fuel injection amount are changed in order to obtain the driving force, the engine 110 can be controlled to a desired power state.

The shift control device 122 includes a calculation device (not illustrated), primary and secondary storage devices (not illustrated), an I/O port (not illustrated), an A/D converter (not illustrated), and the like, which is similar to the engine control device 120 or the brake control device 121 described above.

The transmission 112 controls the hydraulic pressure to obtain a desired reduction ratio so as to convert the driving force of the engine 110 into an appropriate rotational speed and a torque, and transmits the driving force to the differential mechanism 115 and the wheels 114 so that the driving force of the engine 110 can be used for traveling of the vehicle 100.

The brake control device 121 includes a calculation device (not illustrated), primary and secondary storage devices (not illustrated), an I/O port (not illustrated), an A/D converter (not illustrated), and the like, which is similar to the engine control device 120.

The brake control device 121 controls the hydraulic pressure supplied to the brake 111 to change the degree of pressing of the friction body (not illustrated) against the brake disc (not illustrated). As a result, the brake control device 121 can obtain a desired braking force by changing the amount of kinetic energy converted into thermal energy by the brake 111.

Motion Control Device 1

The motion control device 1 includes a calculation device (not illustrated), primary and secondary storage devices (not illustrated), an I/O port (not illustrated), an A/D converter (not illustrated), and the like, which is similar to the engine control device 120 and the like described above.

The motion control device 1 commands a braking/driving force to the engine control device 120, the brake control device 121, and the shift control device 122 based on recognition information detected by the forward recognition sensor 134 and a speed signal from the vehicle speed sensor 131.

The motion control device 1 commands deceleration when an inter-vehicle distance between the vehicle 100 (the host vehicle) and a preceding vehicle is shortened based on the recognition information detected by the forward recognition sensor 134. On the other hand, the motion control device 1 commands acceleration to a predetermined speed when an inter-vehicle distance between the host vehicle and the preceding vehicle is long or when the preceding vehicle is not recognized based on the recognition information detected by the forward recognition sensor 130. In this manner, it becomes possible to cause the host vehicle to travel in accordance with a situation of a surrounding vehicle without causing the host vehicle to approach the preceding vehicle too much.

Next, the motion control device 1 will be described.

Figure 3:
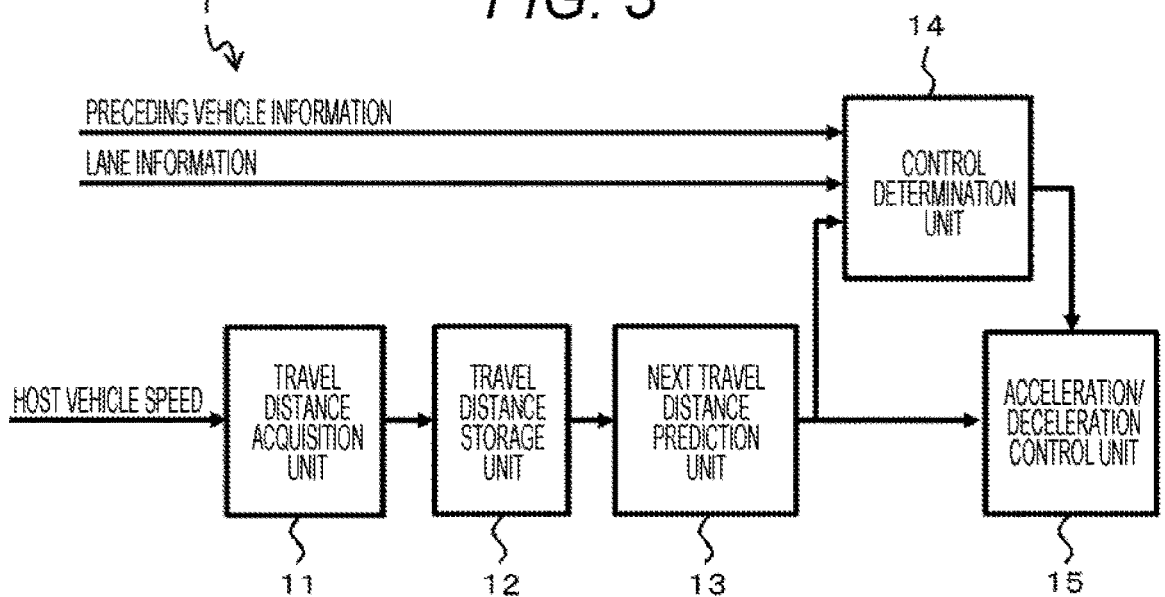
FIG. 3 is a functional block diagram of the motion control device.

FIG. 3 is a functional block diagram of the motion control device 1.

As illustrated in FIG. 3, the motion control device 1 further includes a travel distance acquisition unit 11, a travel distance storage unit 12, a next travel distance prediction unit 13, a control determination unit 14, and an acceleration/deceleration control unit 15.

The travel distance acquisition unit 11 measures a travel distance from a predetermined set vehicle speed state to the next set vehicle speed state. Here, the set vehicle speed state in the embodiment refers to a stop state (that is, the vehicle speed is 0 (zero), which is similarly applied hereinafter) or a low vehicle speed state near 0 (zero) (low vehicle speed equivalent to creeping (for example, lower than 20 km/h)).

The travel distance acquisition unit 11 measures a travel distance from a predetermined stop state to the next stop state when the set vehicle speed state is the stop state. In this manner, the travel distance acquisition unit 11 can grasp a traffic state on a road on which the vehicle 100 is currently traveling with higher accuracy, and prediction accuracy of the next travel distance can be improved.

The travel distance storage unit 12 is a storage device such as a memory, and stores a travel distance from the predetermined stop state acquired by the travel distance acquisition unit 11 to the next stop state.

Here, it is desirable to store all past travel distances from the predetermined stop state to the next stop state when the storage capacity of the travel distance storage unit 12 is large, but information on the latest new travel distance may be preferentially stored when the storage capacity is small.

With this configuration, the storage capacity of the travel distance storage unit 12 can be reduced, and a latest traffic situation can be reflected for prediction of the next travel distance by prioritizing the latest new information. Thus, the prediction accuracy of the next travel distance can be enhanced.

The next travel distance prediction unit 13 calculates a prediction value of the next travel distance based on the newest information (travel distance) stored in the travel distance storage unit 12. Then, the next travel distance prediction unit 13 outputs the calculated prediction value of the next travel distance to the control determination unit 14 and the acceleration/deceleration control unit 15.

Incidentally, the information (travel distance) used in the next travel distance prediction unit 13 is not limited to the newest information, and may be a value (a simple average value or a weighted average value) obtained by averaging a plurality of pieces of latest information. In this manner, for example, when the host vehicle unexpectedly performs temporary stop due to influence of road construction or the like so that a travel distance from the latest stop state to the next stop state is extremely shorter than a travel distance from another latest stop state to the next stop state, the next travel distance prediction unit 13 calculates a prediction value of the next travel distance based on a value obtained by averaging a plurality of pieces of latest information, and thus, can calculate the prediction value of the next travel distance with high accuracy.

The control determination unit 14 determines whether to perform acceleration/deceleration suppression control based on the prediction value of the next travel distance and preceding vehicle information.

A specific determination method in the control determination unit 14 will be described with reference to FIG. 4.

Figure 4:
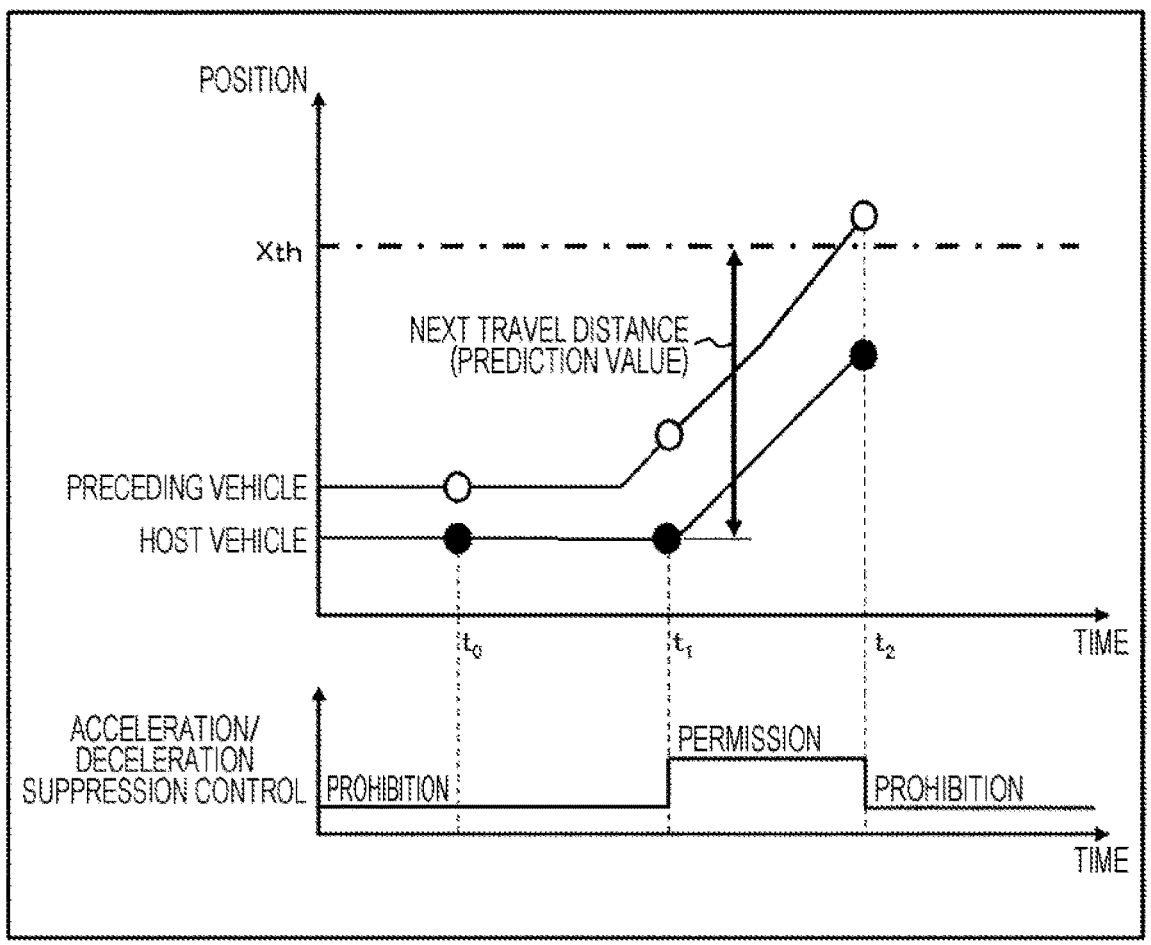
FIG. 4 is a graph for describing an example of prohibition determination or permission determination of acceleration/deceleration suppression control of the vehicle performed by a control determination unit.

FIG. 4 is a graph illustrating an example of prohibition or permission of the vehicle acceleration/deceleration suppression control performed by the control determination unit. FIG. 4 represents time on the horizontal axis and a position on the vertical axis, and both the host vehicle and the preceding vehicle are in the stop state at time to.

At predetermined time t1, the control determination unit 14 calculates an arrival position Xth (the one-dot chain line in FIG. 4) from a current position of the host vehicle (a position of the host vehicle at time t1) based on the prediction value of the next travel distance (the solid arrow in FIG. 4) calculated by the next travel distance prediction unit 13.

The control determination unit 14 sets the arrival position Xth as a reference (threshold) of determination on whether to permit the acceleration/deceleration suppression control. The control determination unit 14 determines to prohibit the acceleration/deceleration suppression control of the host vehicle when a position of the host vehicle or the preceding vehicle exceeds the arrival position Xth and determines to permit the acceleration/deceleration suppression control of the host vehicle when the position of the host vehicle or the preceding vehicle is equal to or less than the arrival position Xth.

If the prediction value of the next travel distance calculated by the next travel distance prediction unit 13 (solid arrow in FIG. 4) is accurate, the travel position of the preceding vehicle until reaching the next stop state does not become greater, by a predetermined value or more, than the position Xth at which the acceleration/deceleration suppression control is permitted.

Therefore, when the traveling position of the preceding vehicle is greater than the position Xth at which the acceleration/deceleration suppression control is permitted by the predetermined value or more (time t2), the control determination unit 14 determines that the prediction value of the next traveling distance is incorrect, and prohibits the acceleration/deceleration suppression control to perform traveling according to normal acceleration/deceleration control. As a result, even when the prediction of the next travel distance deviates, it is possible to reduce a sense of discomfort to a driver by quickly starting normal following with respect to the preceding vehicle.

Here, a condition for prohibition of the acceleration/deceleration suppression control is not limited to the above-described condition. For example, the control determination unit 14 may perform control to prohibit the acceleration/deceleration suppression control when a relative distance (inter-vehicle distance) between the host vehicle and the preceding vehicle is longer than a preset relative distance (inter-vehicle distance).

In addition, when there are a plurality of travel lanes of the vehicle 100, the number of vehicles (the number of preceding vehicles) that travel on a lane differs for each lane, and thus, it becomes difficult to predict the next travel distance from past travel distance information. Therefore, when detecting a lane change of the vehicle 100, for example, when detecting a turn signal provided in the vehicle 100 or when acquiring lane information with an in-vehicle camera or the like and detecting a lane change, the control determination unit 14 may determine to prohibit the acceleration/deceleration suppression control. In this manner, it is possible to suppress inappropriate permission or prohibition of the acceleration/deceleration suppression control performed by the control determination unit 14.

Next, the acceleration/deceleration control unit 15 will be described.

Figure 5:
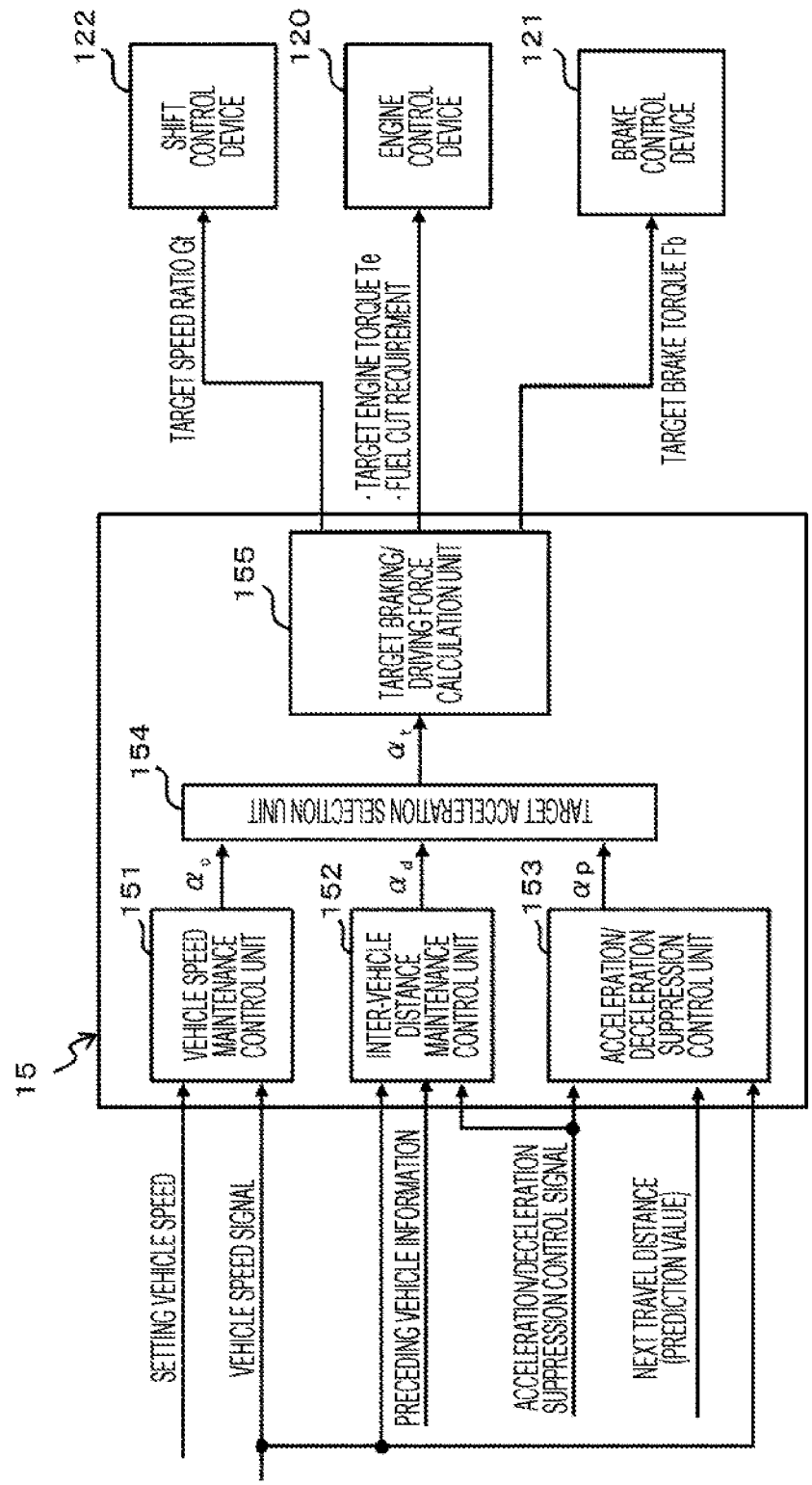
FIG. 5 is a functional block diagram of an acceleration/deceleration control unit.

FIG. 5 is a functional block diagram of the acceleration/deceleration control unit 15.

Figure 6:
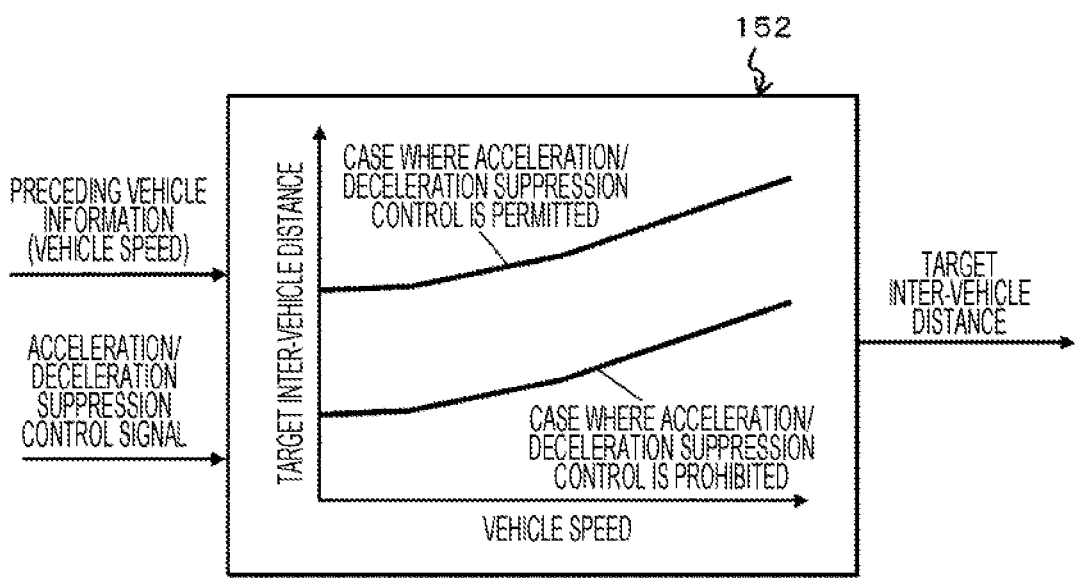
FIG. 6 is a diagram for describing an example of inter-vehicle distance control performed by an inter-vehicle distance maintenance control unit.

FIG. 6 is a diagram for describing an example of inter-vehicle distance control performed by an inter-vehicle distance maintenance control unit 152.

The acceleration/deceleration control unit 15 includes a vehicle speed maintenance control unit 151, the inter-vehicle distance maintenance control unit 152, an acceleration/deceleration suppression control unit 153, a target acceleration selection unit 154, and a target braking/driving force calculation unit 155.

The vehicle speed maintenance control unit 151 calculates a target acceleration $\alpha c$ necessary for a vehicle speed of the host vehicle to become a predetermined set vehicle speed based on a vehicle speed preset by the driver (set vehicle speed), information on a speed limit of a road on which the host vehicle is traveling (vehicle speed signal), and the like. Here, the vehicle speed maintenance control unit 151 considers vehicle speed followability of the host vehicle with respect to the preceding vehicle and calculates the acceleration $\alpha c$ to be larger as a difference between the set vehicle speed and a current vehicle speed is larger.

The inter-vehicle distance maintenance control unit 152 calculates a target acceleration $\alpha d$ of the host vehicle to allow the inter-vehicle distance between the host vehicle and the preceding vehicle to maintain a predetermined inter-vehicle distance based on the preceding vehicle information output by the forward recognition sensor 134. Specifically, as illustrated in FIG. 6, the inter-vehicle distance maintenance control unit 152 performs setting such that a target inter-vehicle distance increases as the vehicle speed of the host vehicle increases and sets the target acceleration $\alpha d$ such that a difference between the target inter-vehicle distance and the inter-vehicle distance becomes small.

Further, in a case where the acceleration/deceleration suppression control is permitted by the control determination unit 14, the inter-vehicle distance maintenance control unit 152 sets the target inter-vehicle distance to a larger value than a case where the acceleration/deceleration suppression control is prohibited.

This is because the vehicle speed (acceleration) of the host vehicle is often lower (low acceleration) than the vehicle speed (acceleration) of the preceding vehicle in each stage of an acceleration stage from the stop state of the host vehicle to a steady-state driving (cruise driving), a steady-state driving stage, and a deceleration stage from the steady-state driving to a stop, for example, when the acceleration/deceleration suppression control is permitted.

For this reason, an effect of the acceleration/deceleration suppression control is reduced unless the setting is performed to allow separation of the inter-vehicle distance between the host vehicle and the preceding vehicle.

Returning to FIG. 5, the acceleration/deceleration suppression control unit 153 calculates a target acceleration $\alpha p$ for the acceleration/deceleration suppression control based on the prediction value of the next travel distance and an acceleration/deceleration suppression control signal.

As an example of the acceleration/deceleration suppression control, there is a method of controlling a fuel cut timing during deceleration (inertia deceleration) based on the next travel distance. As the host vehicle is subjected to inertia deceleration to start fuel cut before the preceding vehicle decelerates, the fuel consumption of the host vehicle can be reduced.

Next, an example of the acceleration/deceleration suppression control performed by the acceleration/deceleration suppression control unit 153 will be described.

Figure 7:
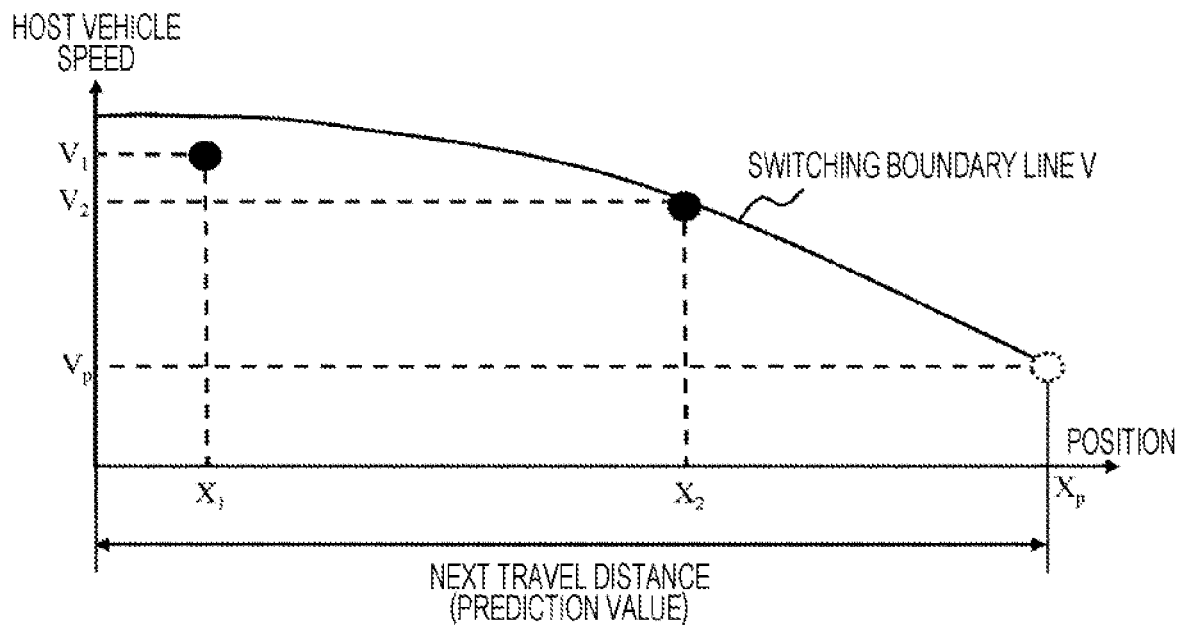
FIG. 7 is a graph for describing an example of acceleration/deceleration suppression control during vehicle deceleration.

FIG. 7 is a graph for describing an example of the acceleration/deceleration suppression control during deceleration of the vehicle 100.

Figure 8:
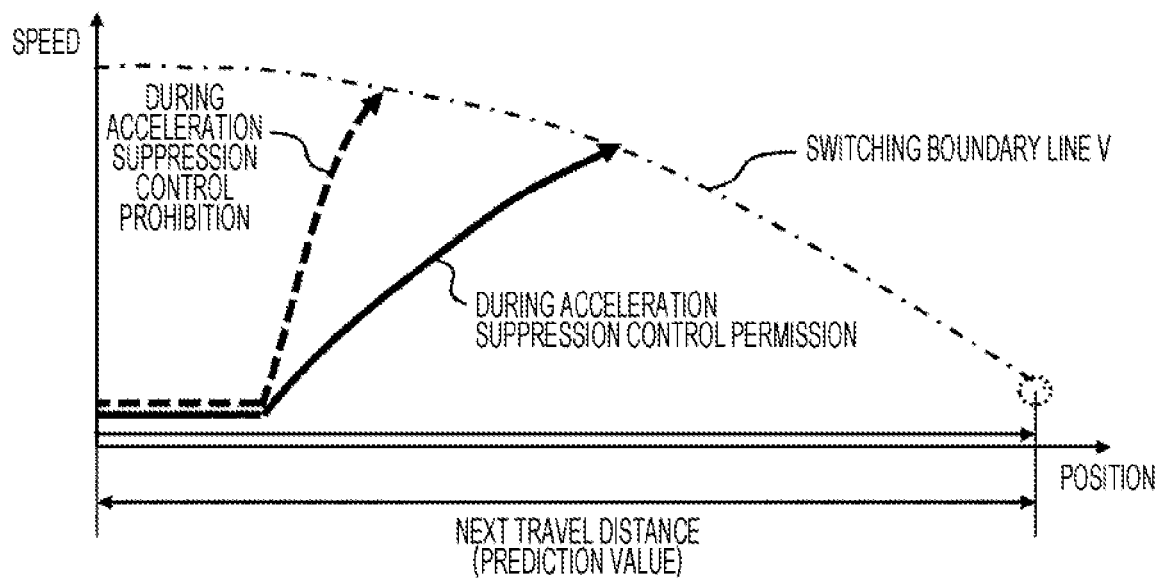
FIG. 8 is a graph for describing an example of acceleration/deceleration suppression control during vehicle acceleration.

FIG. 8 is a graph for describing an example of the acceleration/deceleration suppression control during acceleration of the vehicle 100.

Figure 9:
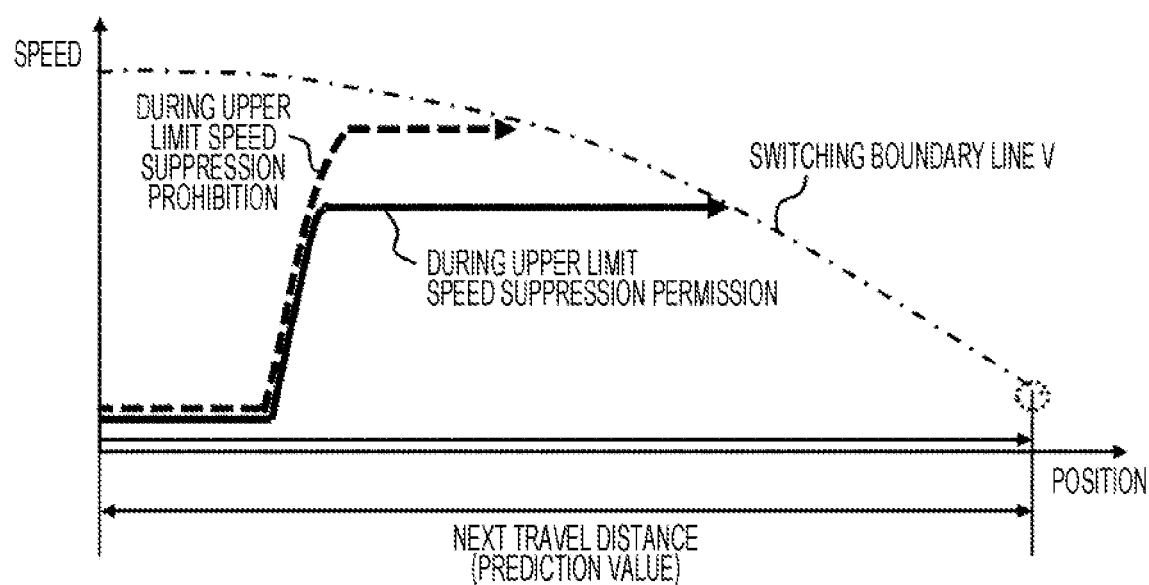
FIG. 9 is a graph for describing an example of acceleration/deceleration suppression control during steady-state driving of the vehicle.

FIG. 9 is a graph for describing an example of the acceleration/deceleration suppression control during steady-state driving of the vehicle 100.

As illustrated in FIG. 7, the acceleration/deceleration suppression control unit 153 calculates a boundary line V (solid line) for switching to low fuel consumption control by the following Formula 1 based on an acceleration $\alpha$ that should be recommended from the viewpoint of fuel consumption of the host vehicle with respect to an arrival position Xp and a set speed Vp (round dotted line) calculated based on the next travel distance predicted by the next travel distance prediction unit 13.

$$V=\sqrt{V_p^2-2\alpha(X_p-x)} \qquad \text{[Formula 1]}$$

Here, the acceleration $\alpha$ that should be recommended from the viewpoint of the fuel consumption of the host vehicle is calculated based on any acceleration either an acceleration $\alpha s$ equivalent to a travel resistance in which engine driving energy does not contribute to an increase in kinetic energy (the following Formula 2) or an acceleration $\alpha e$ (the following Formula 3) during engine braking that does not consume fuel.

$$\alpha_s = -\frac{1}{M} C_d S V^2 - \mu g \cos\theta - g \sin\theta \quad \text{[Formula 2]}$$

$$\alpha_e = \alpha_s + F_{ed} \times G_c \times G_f / r \quad \text{[Formula 3]}$$

Here, M is a vehicle weight, Cd is an air resistance coefficient, S is a front projection area of a vehicle, V is a vehicle speed, μ is a rolling resistance coefficient, g is a gravitational acceleration, θ is a road surface gradient, Fed is an engine friction torque during engine braking, Gc is a gear ratio as a speed ratio, Gf is a final reduction gear ratio, and r is a radius of a wheel (tire).

As illustrated in FIG. 7, when a current position of the host vehicle is x1 and a speed is V1, the fuel cut control during deceleration is not performed because the host vehicle is not in contact with the switching boundary line V. When a current position of the host vehicle is X2 and a speed is V2, the fuel cut control during deceleration is performed since the vehicle is in contact with the switching boundary line V.

Here, if the target acceleration αp for the acceleration/deceleration suppression control is set to be higher than the acceleration αe during engine braking, it is sufficient without requiring a braking force greater than that of the engine brake.

Thus, in the vehicle 100, it is possible to suppress generation of an energy loss (braking force) caused by the brake 111 and to improve the fuel consumption of the vehicle 100.

Then, an upper limit acceleration during acceleration of the host vehicle may be suppressed based on the prediction value of the next travel distance in order to further reduce the fuel consumption. Specifically, as illustrated in FIG. 8, when determining that the prediction value of the next travel distance is less than a predetermined value, the acceleration/deceleration suppression control unit 153 decreases the upper limit acceleration during acceleration of the host vehicle by the acceleration/deceleration control. As a result, the vehicle speed (acceleration) of the host vehicle when reaching the switching boundary line V can be reduced in the case of permitting the acceleration suppression control of the vehicle (solid line) more than in the case of prohibiting the acceleration/deceleration suppression control (dotted line). As a result, the vehicle 100 is driven in a state where the engine efficiency is favorable as much as the speed (acceleration) until reaching the switching boundary line V can be reduced, and thus, the fuel consumption of the vehicle 100 can be improved.

In addition, the method of reducing the fuel consumption based on the next travel distance is not limited to the method of suppressing acceleration αs as described above. For example, as illustrated in FIG. 9, a method of limiting an upper limit speed during steady-state driving (cruising) of the vehicle 100 may be used.

Specifically, the acceleration/deceleration suppression control unit 153 sets an upper limit speed of the vehicle 100 to be lower as the next travel distance is shorter. As illustrated in FIG. 9, such suppressed upper limit speed information is input to the vehicle speed maintenance control unit 151 so that the vehicle speed at the time of being in contact with the switching boundary line V can be reduced in a case of permitting the upper limit speed suppression (solid line) more than in a case of prohibiting the upper limit speed suppression (dotted line). As a result, the acceleration until the vehicle 100 reaches the upper limit speed does not change while improving the fuel consumption of the vehicle 100, and thus, it is possible to reduce the sense of discomfort due to an acceleration delay given to the driver.

Further, there is a case where the acceleration/deceleration suppression control unit 153 starts deceleration based on vehicle information that is not viewable from a driver's seat of the host vehicle. In this case, the driver feels a state where the acceleration is suddenly suppressed, which may cause the sense of discomfort. Therefore, a system that informs (notifies) the driver of information on the acceleration/deceleration suppression control, such as a navigation system and a head-up display, may be provided in the vehicle 100, and the information may be presented to the driver during the acceleration/deceleration suppression control.

The target acceleration selection unit 154 selects the smallest value out of the calculated target accelerations (αc, αd, and αp), and calculates a target acceleration αt based on the selected target acceleration.

The target acceleration selection unit 154 outputs the target acceleration αt to the target braking/driving force calculation unit 155. Here, when a signal permitting the acceleration/deceleration suppression control is not input (the acceleration/deceleration suppression control is prohibited), the target acceleration selection unit 154 invalidates a request for the target acceleration αp calculated by the acceleration/deceleration suppression control unit 153, and compares the target acceleration αc calculated by the vehicle speed maintenance control unit 151 with the target acceleration αd calculated by the inter-vehicle distance maintenance control unit to calculate the target acceleration αt.

The target braking/driving force calculation unit 155 calculates a target speed ratio Gt, a target engine torque Te, a fuel cut requirement, a target brake torque, and the like based on the target acceleration αt calculated by the target acceleration selection unit 154.

The target braking/driving force calculation unit 155 calculates a target braking/driving force Ft from the target acceleration αt using the following Formula 4.

$$F_t = M\alpha_t + \tfrac{1}{2} C_d S V^2 + \mu g M \cos\theta + Mg \sin\theta \quad \text{[Formula 4]}$$

Next, in order to calculate the target speed ratio, it is necessary to calculate a target engine speed R. Then, in order to calculate the target engine speed R, a target engine output Pe is calculated from the target driving force Ft and the vehicle speed using the following Formula 5.

$$P_e = F_t \times V \quad \text{[Formula 5]}$$

Figure 10:
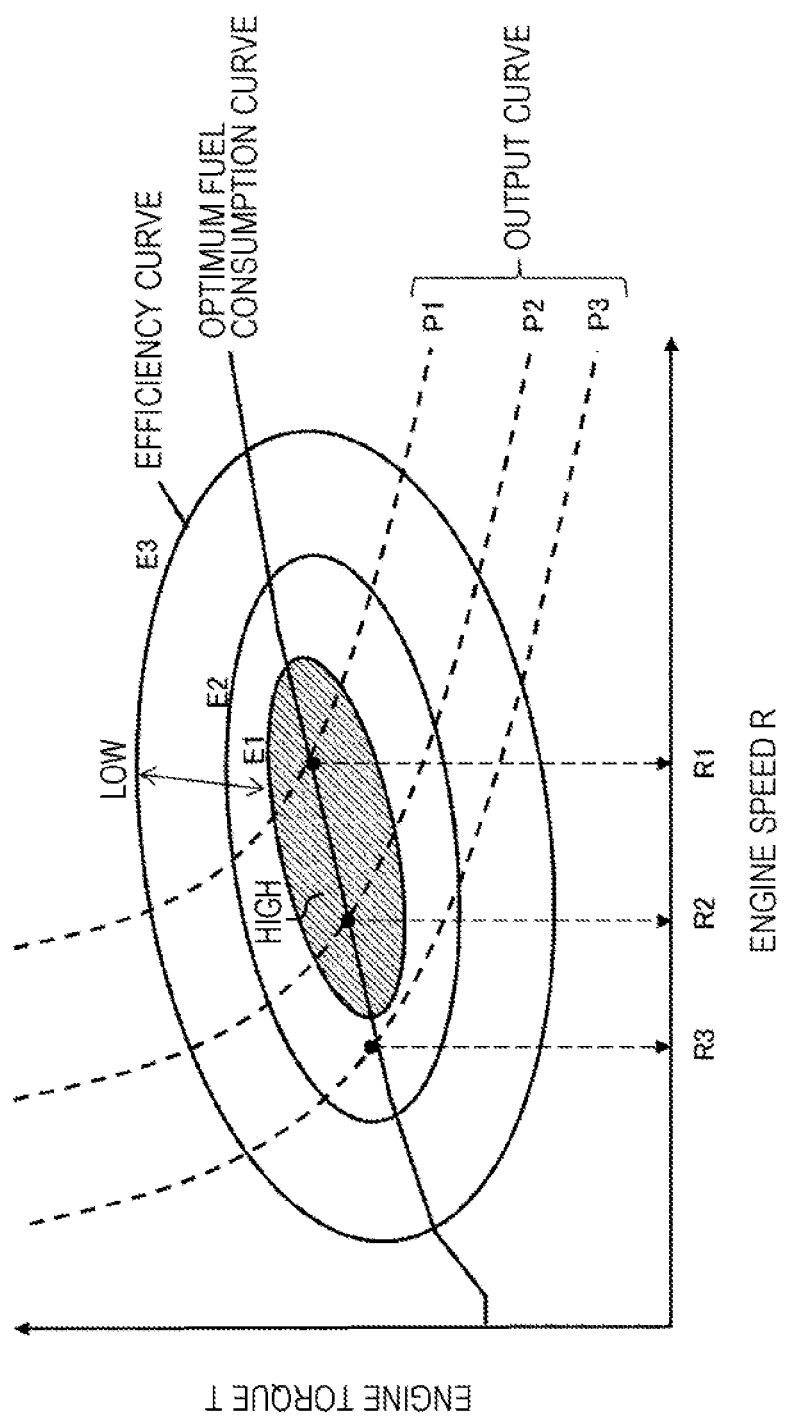
FIG. 10 is a graph representing an output and an efficiency characteristic of a vehicle engine.

Next, the target engine speed R is calculated based on the target engine output Pe and an engine efficiency characteristic illustrated in FIG. 10.

Here, FIG. 10 represents an output and the efficiency characteristic of the engine of vehicle 100. In FIG. 10, the horizontal axis represents an engine speed R and the vertical axis represents an engine torque T.

As illustrated in FIG. 10, the closer an efficiency curve (solid line) is to the center (E1>E2>E3), the higher the engine efficiency of the vehicle 100 is. In addition, the most efficient rotational speed at a certain output is a point where an output curve (dotted line) and an optimum fuel consumption curve intersect each other. In the case of FIG. 10, an optimum fuel consumption engine speed is R1, R2, and R3 for outputs P1, P2, and P3, respectively.

Figure 11:
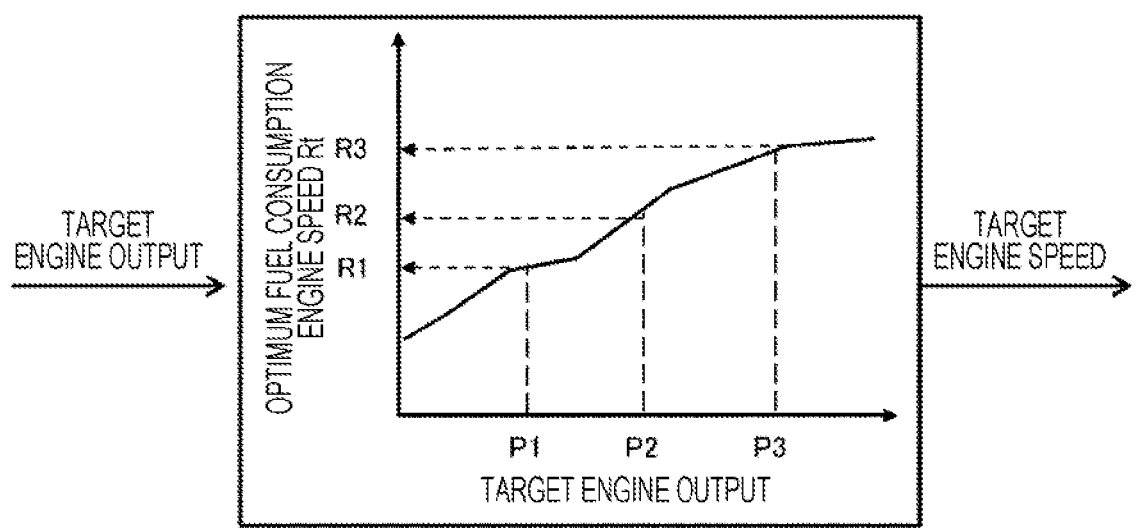
FIG. 11 is a graph representing a relationship between a target engine output and an optimum fuel consumption engine speed.

Based on such a relationship, a relationship of an optimum fuel consumption engine speed Rt with respect to the target engine output is given as illustrated in FIG. 11. As this optimum fuel consumption engine speed Rt is output as the target engine speed, the efficient engine control becomes possible. Further, the target speed ratio Gt can be calculated by the following Formula 6 based on the target engine speed Rt and the vehicle speed V. Here, r represents a tire radius.

$$G_t = \frac{V}{R_t} \times \frac{60}{2\pi r}$$ [Formula 6]

Next, the target engine torque Te can be calculated using the following Formula 7 based on the target driving force Ft, the target speed ratio Gt, and the like.

$$T_e = \frac{r \times F_t}{G_f \times G_c \times G_t}$$ [Formula 7]

Here, r is an effective radius of a tire, Gf is a gear ratio of a final reduction gear, Gc is a speed ratio of CVT, and Gt is a torque amplification ratio of Tc.

Regarding the fuel cut requirement, the fuel cut requirement is turned on based on a result of a comparison between the target driving force Ft and an engine friction torque Ted as illustrated in the following Formula 8, deceleration using a fuel cut state, that is, the engine brake becomes possible.

$$Fuelcut \text{ request} = \begin{cases} \text{on} \dots \left(T_{ed} > \frac{r \times F_t}{G_f \times G_c}\right) \\ \text{off} \dots \left(T_{ed} \leq \frac{r \times F_t}{G_f \times G_c}\right) \end{cases}$$ [Formula 8]

Figure 12:
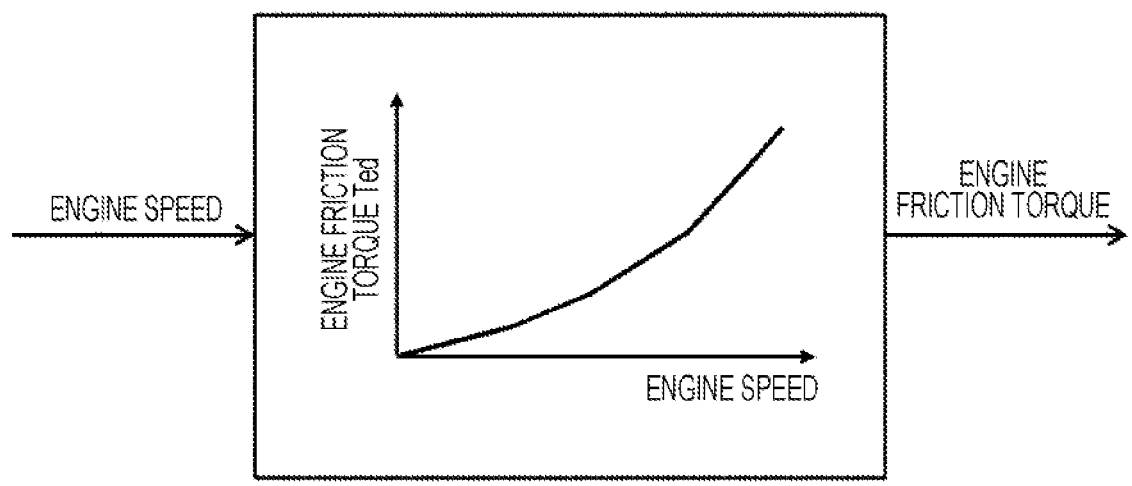
FIG. 12 is a graph representing a relationship between an engine speed and an engine friction torque.

Here, the engine friction torque Ted can be calculated based on a relationship between the engine speed and the engine friction torque Ted according to the engine specifications as illustrated in FIG. 12.

FIG. 12 is a graph representing the relationship between the engine speed and the engine friction torque Ted.

A target brake torque can be calculated by the following Formula 9 using the target driving force Ft, the target speed ratio Gt, and the like.

$$F_b = T_{ed} \times G_c \times G_f - F_t \times r$$ [Formula 9]

Here, the engine friction torque Ted indicates an engine friction torque during the engine fuel cut. In addition, the engine torque equivalent to creeping is transmitted to the wheels during idling without fuel cut when the vehicle 100 decelerates, and thus, the calculation is performed using the engine torque equivalent to creeping instead of the engine friction torque Ted.

Returning to FIG. 5, the target engine torque Te calculated by the acceleration/deceleration control unit 15 is output to the engine control device 120.

Based on the target engine torque Te output from the acceleration/deceleration control unit 15, the engine control device 120 calculates a fuel/air supply amount signal that commands the supply amount of fuel/air to the engine 110. As a result, the torque generated by the engine 110 can be controlled.

In addition, the target speed ratio Gt calculated by the acceleration/deceleration control unit 15 is output to the shift control device 122 as illustrated in FIG. 5.

Based on the target speed ratio Gt output from the acceleration/deceleration control unit 15, the shift control device 122 calculates a transmission hydraulic pressure signal that commands a hydraulic pressure to be supplied to the transmission 112. As a result, the speed ratio of the transmission 112, that is, the rotational speed of the engine 110 can be controlled.

Further, the target brake torque Fb calculated by the acceleration/deceleration control unit 15 is output to the brake control device 121 as illustrated in FIG. 5.

The brake control device 121 calculates a brake hydraulic pressure signal that commands a hydraulic pressure to be supplied to the brake 111 based on the target brake torque Fb output by the acceleration/deceleration control unit 15. As a result, the braking force generated by the brake 111 can be controlled.

Figure 13:
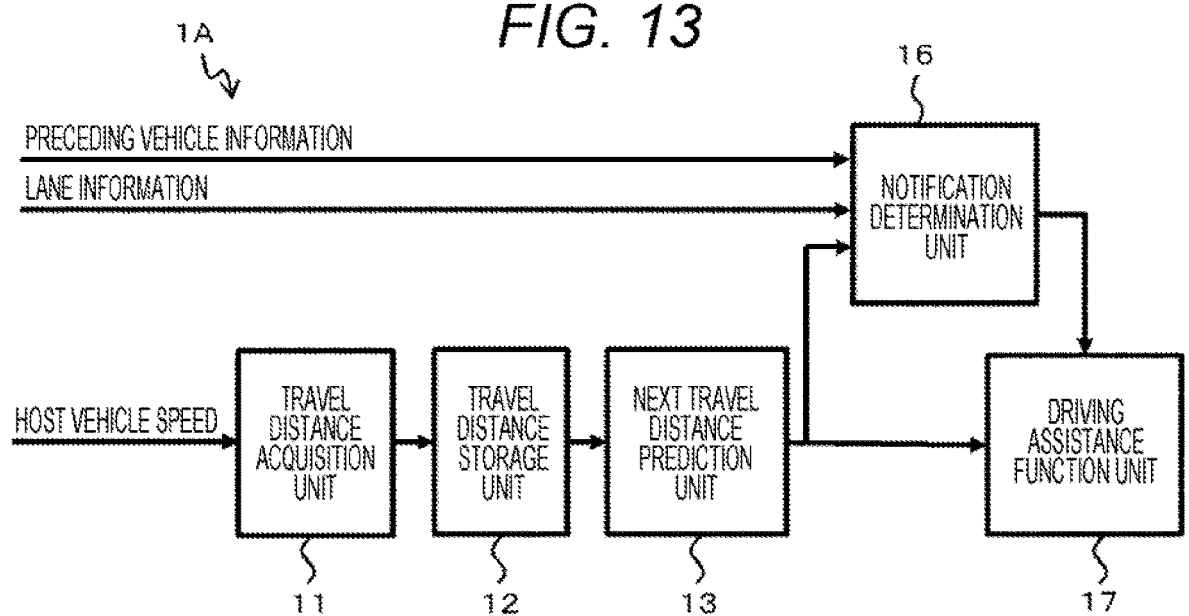
FIG. 13 is a view for describing a vehicle driving assistance function.

Further, the acceleration/deceleration control using the prediction value of the next travel distance of the vehicle 100 is not limited to a case of automatically controlling acceleration/deceleration of the vehicle 100 (a case of automatic driving by the vehicle). As illustrated in FIG. 13, the acceleration/deceleration control using the prediction value of the next travel distance of the vehicle 100 may be applied to a driving assistance function in a case where a driver (not illustrated) drives a vehicle (in a case of manual driving by the driver).

FIG. 13 is a view for describing the driving assistance function of the vehicle 100.

A motion control device 1A having the driving assistance function that supports driving of the driver includes the travel distance acquisition unit 11, the travel distance storage unit 12, the next travel distance prediction unit 13, a notification determination unit 16, and a driving assistance function unit 17.

The travel distance acquisition unit 11, the travel distance storage unit 12, and the next travel distance prediction unit 13 are the same as those described above, and thus, will be denoted by the same numbers and will be described as necessary.

In the motion control device 1A, a prediction value of the next travel distance, preceding vehicle information, and a lane (lane) information are input to the notification determination unit 16.

In the notification determination unit 16, whether to inform (notify) the driver is determined by the same determination method as the control determination unit 14 using the prediction value of the next travel distance, the preceding vehicle information, the lane information, and the like.

In the motion control device 1A, the switching boundary line V (see FIGS. 7 to 9) is calculated by the method described above based on the prediction value of the next travel distance.

Then, the driving assistance function unit 17 of the motion control device 1A informs the driver using a sound, a lamp, or a reaction force of an accelerator pedal (supports low fuel consumption driving of the driver) when a point represented by the next travel distance (prediction value) and a host vehicle speed is in contact with the boundary line and notification is permitted as a result of the determination performed by the notification determination unit 16. As a result, the fuel consumption can be improved not only during the acceleration/deceleration suppression control in automatic driving but also during the driving by the driver.

Second Embodiment

Next, a vehicle motion control device 2 according to a second embodiment of the present invention will be described.

This motion control device 2 is also mounted on a vehicle 200 and used for control of a motion of the vehicle 200.

Figure 14:
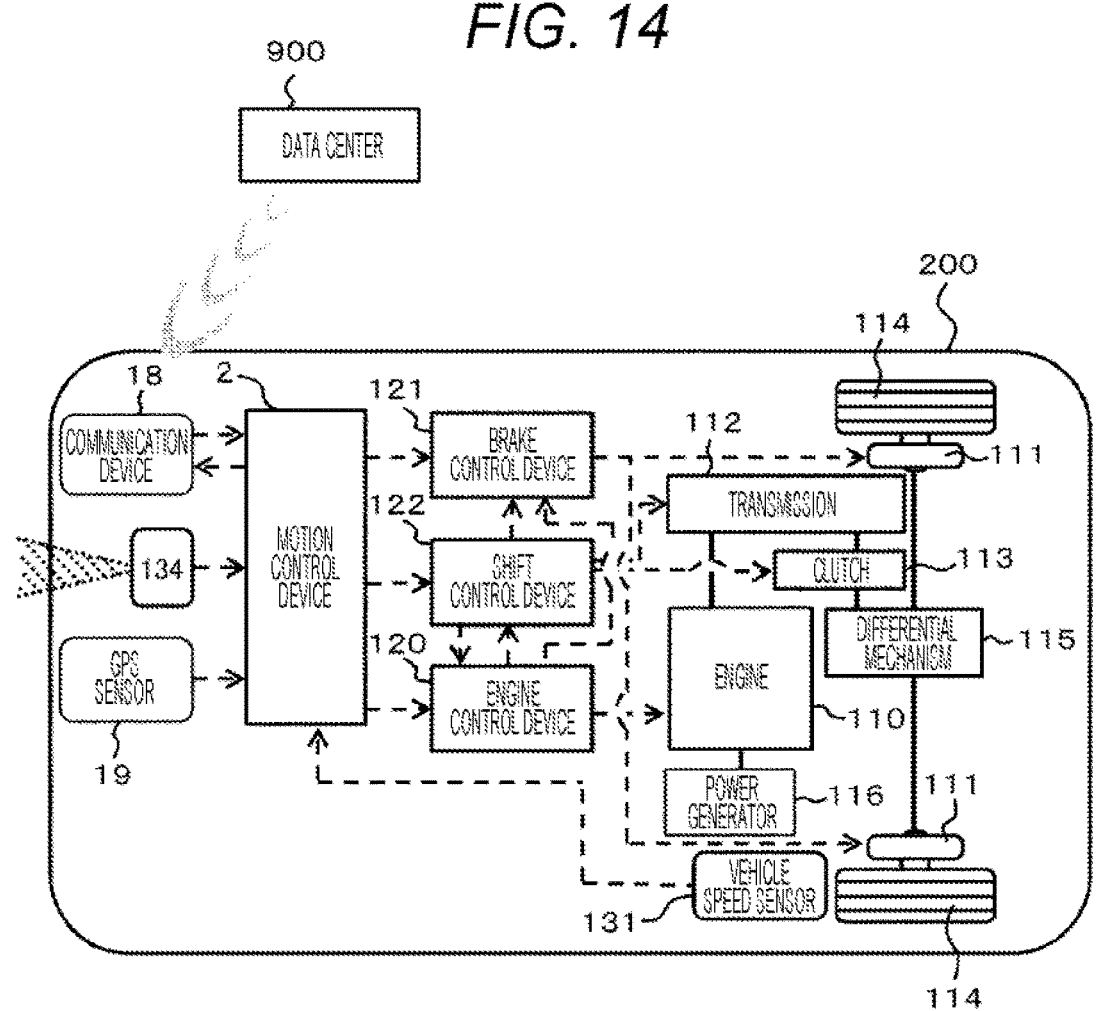
FIG. 14 is a block diagram for describing a vehicle equipped with a motion control device according to a second embodiment.

FIG. 14 is a block diagram for describing the vehicle 200 equipped with the motion control device 2 according to the second embodiment.

Overall Configuration of Vehicle According to Second Embodiment

The motion control device 2 according to the second embodiment has a configuration in which a communication device 18 that performs communication with a data center 900 and a GPS sensor 19 are provided, which is different from the above-described embodiment. Other configurations and functions are the same as those of the motion control device 1 of the above-described embodiment, and thus, will be denoted by the same reference signs and will be described as necessary.

The GPS sensor 19 can acquire position (latitude and longitude) information of the vehicle 200 (host vehicle), and the communication device 18 communicates with the data center 900. Here, an object to be communicated with the communication device 18 is not only the data center 900 but also indicates a device having a function of performing road-to-vehicle communication with equipment installed on a road or a function of performing vehicle-to-vehicle communication with a surrounding vehicle other than the vehicle 100 (host vehicle) having a communication terminal.

Figure 15:
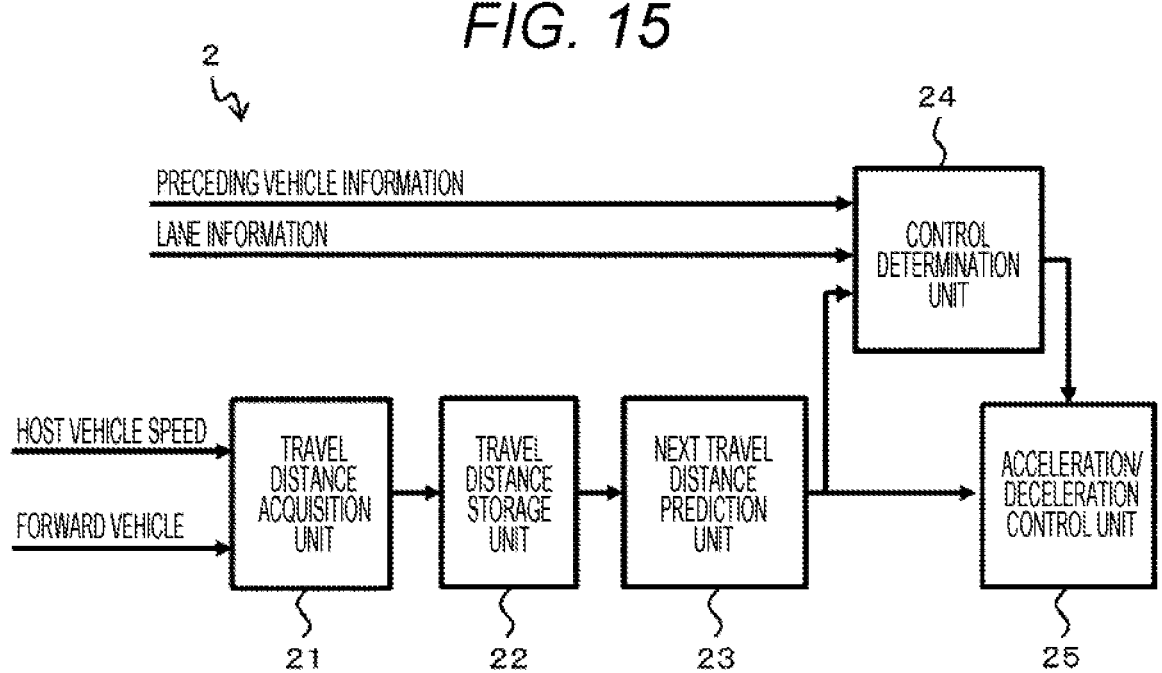
FIG. 15 is a functional block diagram of the motion control device according to the second embodiment.

FIG. 15 is a functional block diagram of the motion control device 2.

The motion control device 2 includes a travel distance acquisition unit 21, a travel distance storage unit 22, a next travel distance prediction unit 23, a control determination unit 24, and an acceleration/deceleration control unit 25, and is different from the motion control device 1 according to the above-described embodiment in terms that vehicle speed information of the host vehicle and forward vehicle information are input to the travel distance acquisition unit 21. Other configurations and functions are the same as the respective configurations 11, 12, 13, 14, and 15 of the motion control device 1 according to the above-described embodiment, and thus, will be described as necessary.

In the travel distance acquisition unit 21, not only a travel distance from a stop state of the vehicle 200 (host vehicle) to the next stop state but also the forward vehicle information including preceding vehicles is acquired based on information acquired from the forward recognition sensor 134 and the communication device 18.

The travel distance storage unit 22 stores the travel distances from the stop state to the next stop state of a forward vehicle of the host vehicle including the vehicle 200 (the host vehicle). Here, since the storage capacity of the travel distance storage unit 12 is limited, the latest new information is preferentially stored, and information on a preceding vehicle that is closer to the host vehicle ahead of the host vehicle is preferentially stored. Since the latest new information and the information on the closest preceding vehicle are preferentially utilized, the latest information can be reflected in prediction of the next travel distance in the next travel distance prediction unit 23. Thus, the prediction accuracy of the next travel distance can be enhanced.

The next travel distance prediction unit 23 calculates a prediction value of the next travel distance based on the recorded travel distances of the host vehicle and the preceding vehicle ahead of the host vehicle. Specific processing will be described with reference to FIG. 16.

Figure 16:
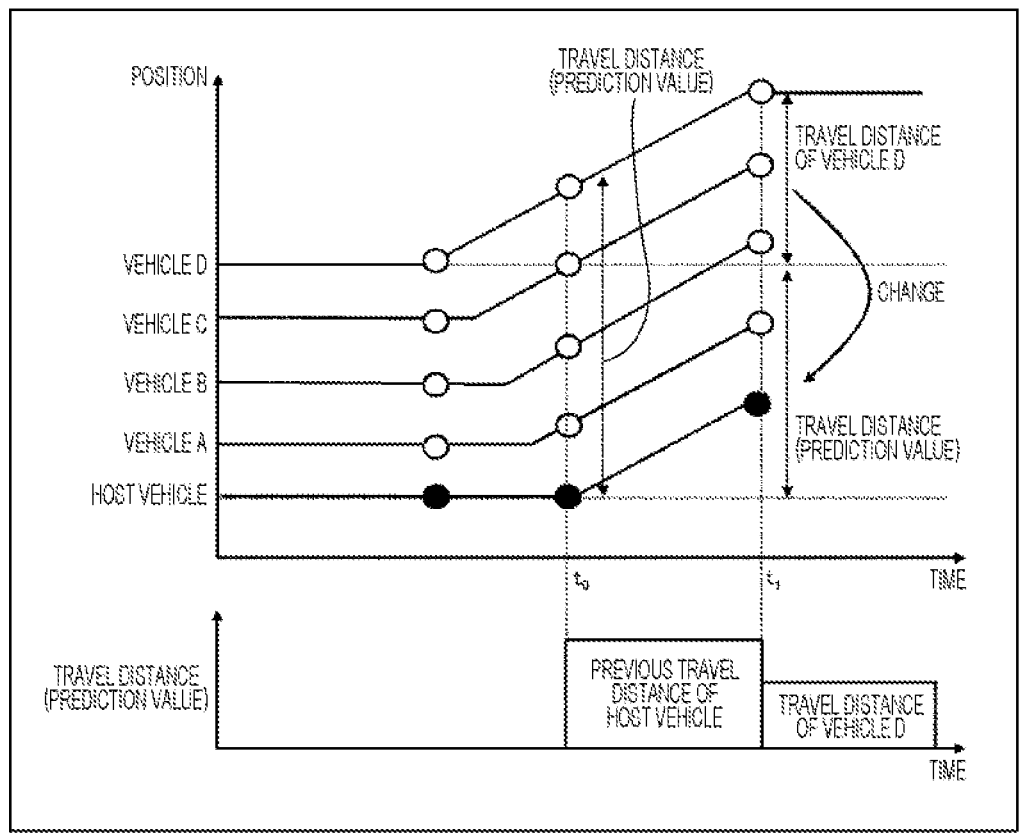
FIG. 16 is a graph for describing a method of calculating a prediction value of a travel distance.

FIG. 16 is a graph for describing a method of calculating a prediction value of a travel distance. In the upper graph of FIG. 16, the horizontal axis represents time, and the vertical axis represents a vehicle position, and a case where vehicles A to D exist ahead of the vehicle 200 (host vehicle) is illustrated. In the lower graph of FIG. 16, the horizontal axis represents time, and the vertical axis represents a travel distance prediction value.

As illustrated in FIG. 16, the motion control device 2 sets the prediction value of the next travel distance to a previous travel distance of the host vehicle to perform acceleration/deceleration suppression control at time t0. When a travel distance of the vehicle D ahead of the host vehicle is confirmed at time t1, the motion control device 2 sets the prediction value of the travel distance of the host vehicle as the travel distance of the vehicle D to perform acceleration/deceleration suppression control.

This is because an actual travel distance from a stop state to the next stop state of a preceding vehicle ahead of the host vehicle, which is more recent, can more accurately capture the traffic flow than the previous travel distance (prediction value of the next travel distance) of the host vehicle. When the travel distance of the preceding vehicle ahead of the host vehicle is confirmed, the motion control device 2 performs control using the travel distance of the vehicle ahead of the host vehicle as the travel distance prediction value so that the travel distance prediction accuracy can be improved.

Third Embodiment

Next, a motion control device 3 according to a third embodiment will be described.

This motion control device 3 is also mounted on a vehicle 300 and used for control of a motion of the vehicle 300.

Figure 17:
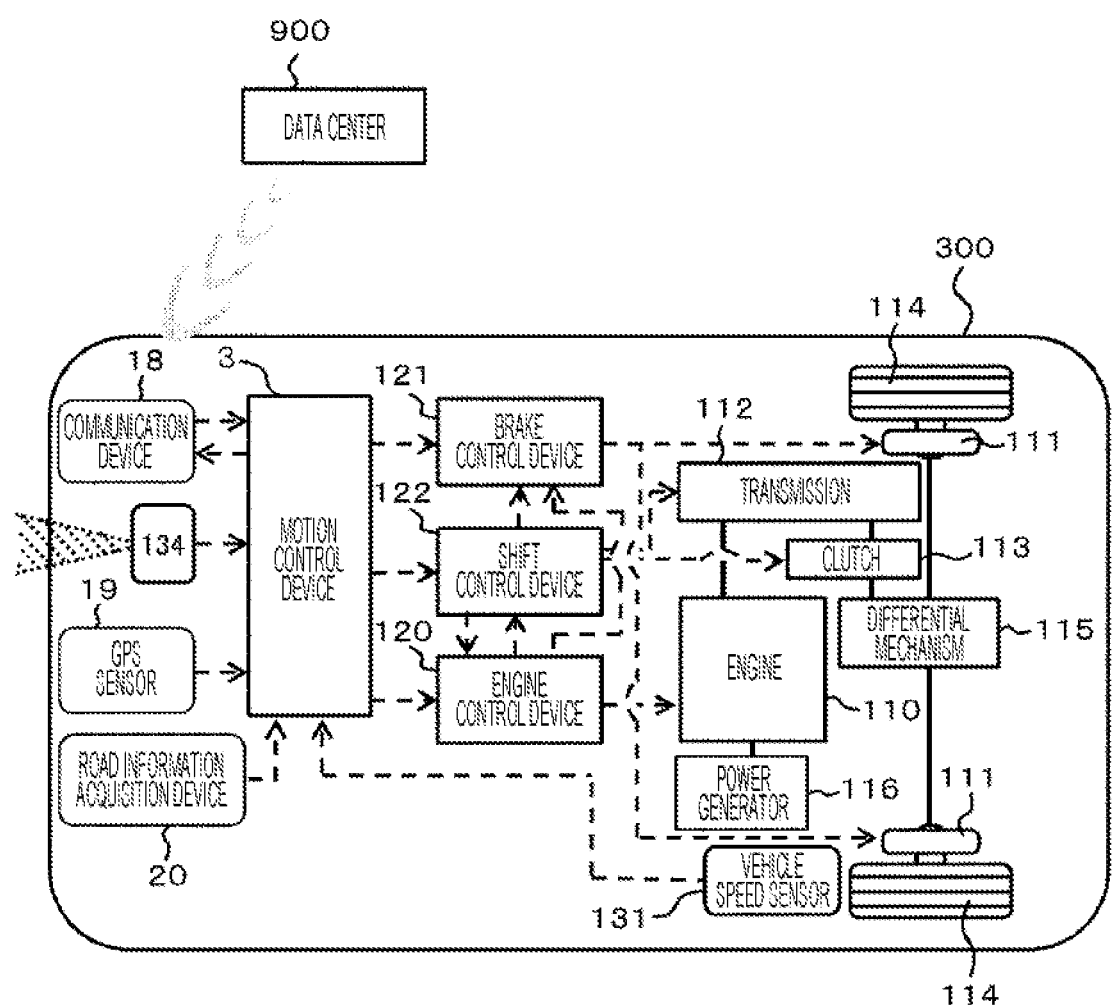
FIG. 17 is a block diagram for describing a vehicle equipped with a motion control device according to a third embodiment.

FIG. 17 is a block diagram illustrating the vehicle 300 equipped with the motion control device 3 according to the third embodiment.

Overall Configuration of Vehicle According to Third Embodiment

The motion control device 3 according to the third embodiment is different from the above-described embodiment in terms of a configuration in which a road information acquisition device 20 is further provided. Other configurations are the same as those of the motion control device 2 of the above-described embodiment, and thus, will be denoted by the same reference signs and will be described as necessary.

Here, the road information acquisition device 20 stores road information acquired in a storage device (not illustrated) of the road information acquisition device 20. In addition, the road information acquisition device 20 may be a device also having a function of adding not only the road information stored in the storage device (not illustrated) but also information from the data center 900 or equipment or the like installed on a road, acquired via the communication device 18, to the road information.

Figure 18:
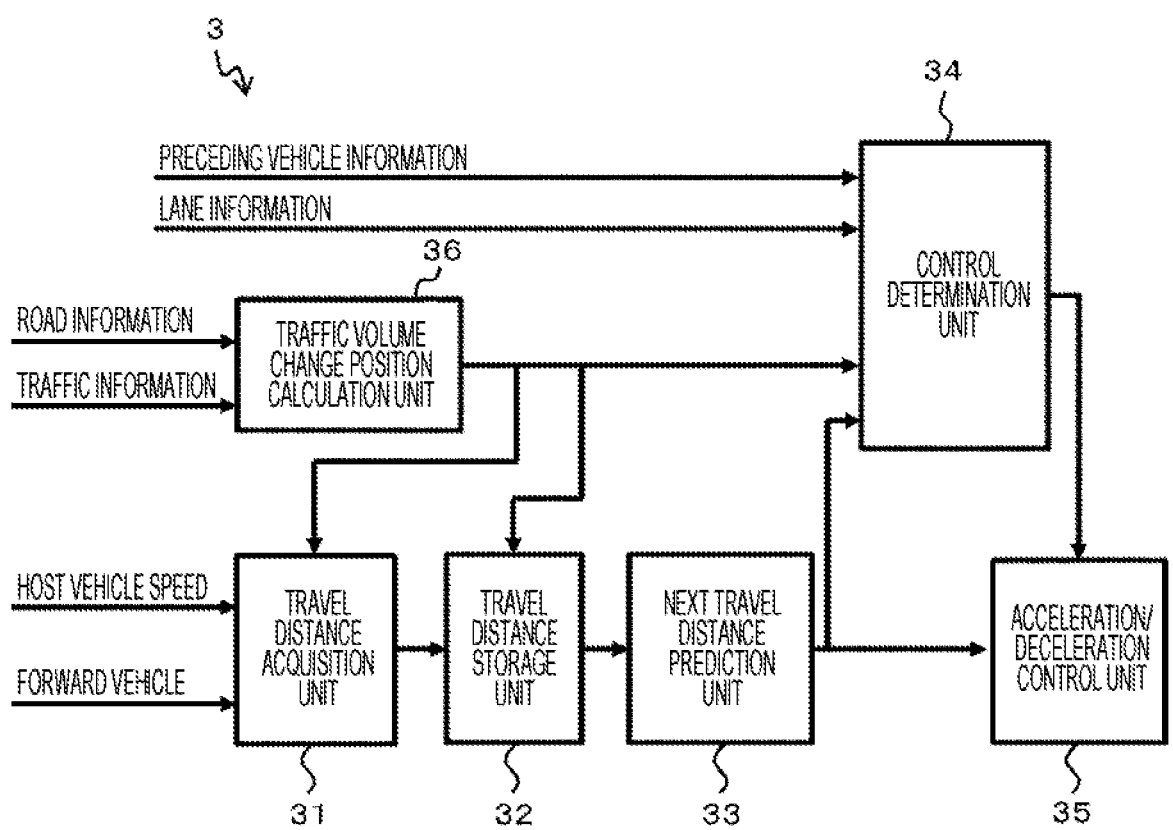
FIG. 18 is a functional block diagram of the motion control device according to the third embodiment.

FIG. 18 is a functional block diagram of the motion control device 3.

As illustrated in FIG. 18, the motion control device 3 includes a travel distance acquisition unit 31, a travel distance storage unit 32, a next travel distance prediction unit 33, a control determination unit 34, an acceleration/deceleration control unit 35, and a traffic volume change position calculation unit 36, and is different from the motion control device 2 according to the embodiment described above in terms that the traffic volume change position calculation unit 36 is provided. Other configurations and functions are the same as the respective configurations 11, 12, 13, 14, and 15 of the motion control device 1 according to the above-described embodiment, and thus, will be described as necessary.

The traffic volume change position calculation unit 36 calculates a position where a traffic volume changes from the data center 900 via the road information acquisition device 20 and the communication device 18. A specific processing method of the traffic volume change position calculation unit 36 will be described with reference to FIGS. 19, 20A and 20B.

Figure 19:
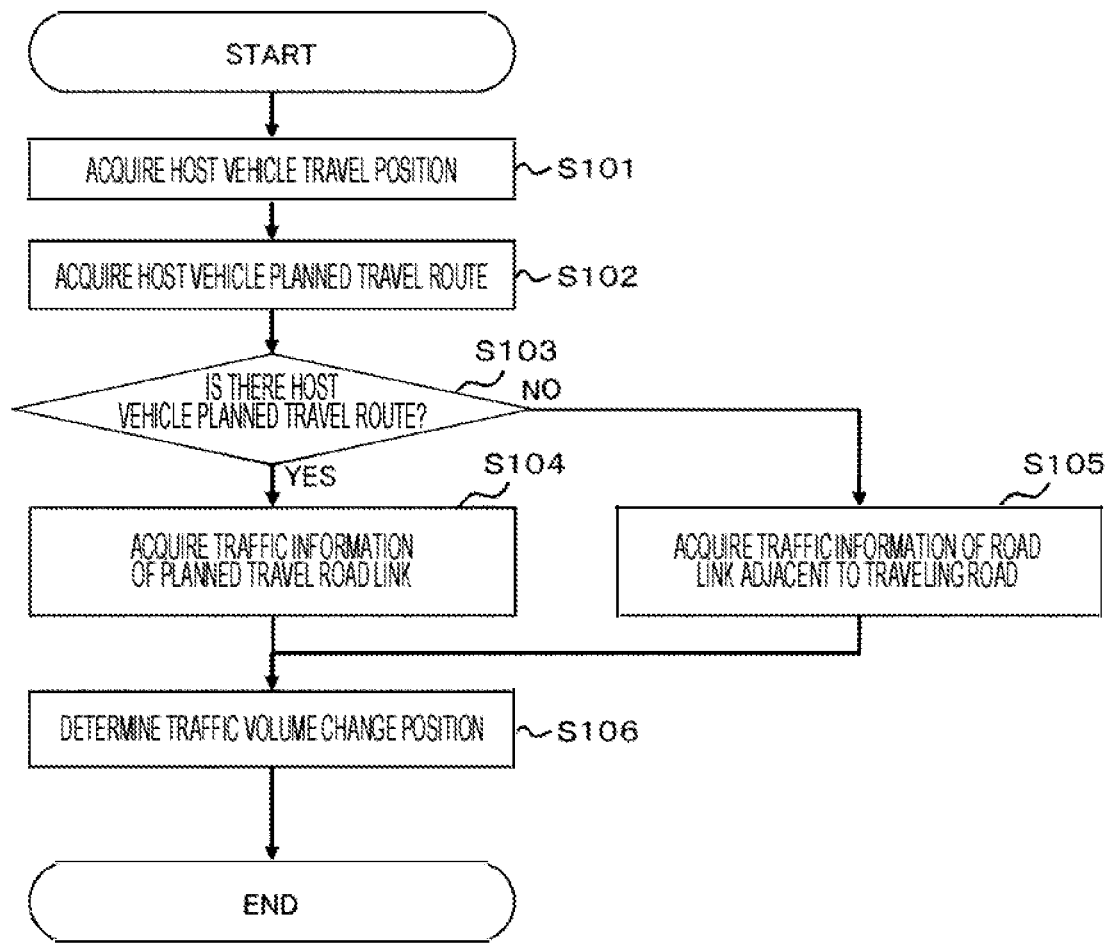
FIG. 19 is a flowchart of traffic volume change position determination processing.

FIG. 19 is a flowchart of traffic volume change position determination processing.

Figure 20A:
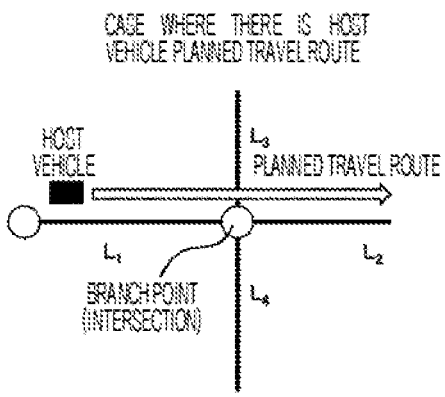
FIGS. 20A and 20B are schematic views for describing determination of a traffic volume change position.
Figure 20B:
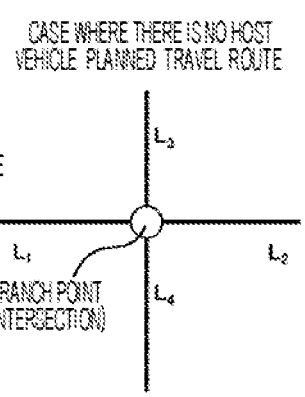

FIGS. 20A and 20B are schematic views for describing determination of a traffic volume change position.

As illustrated in FIG. 19, in Step S101, the motion control device 3 acquires latitude and longitude position information from the GPS sensor 19 and acquires road information on which the host vehicle is traveling from the road information acquisition device 20. Then, the motion control device 3 estimates a position of a road on which the vehicle 300 (host vehicle) is traveling based on the acquired position information and road information.

In Step S102, the motion control device 3 acquires a planned travel route of the vehicle 300 (host vehicle) set by a driver using a navigation system (not illustrated) provided in the vehicle 300 (host vehicle). Here, the planned travel route includes information on a road link planned to travel next.

Next, in Step S103, the motion control device 3 determines that there is a host vehicle planned travel route (Step S103: Yes) when there is the route information set by the driver by the navigation system (not illustrated) or the like provided in the vehicle 300, and proceeds to Step S104. On the other hand, when there is no route information set by the driver, the motion control device 3 determines that there is no host vehicle planned travel route (Step S103: No), and proceeds to Step S105.

Here, in the embodiment, a road on which the host vehicle is currently traveling is defined as a road link L1, a road adjacent to the road link L1 in an advancing direction with a branch road (intersection: sometimes referred to as a node) sandwiched therebetween is defined as a road link L2, and roads that are adjacent to the road link L1 in an orthogonal direction are defined as road links L3 and L4, respectively, as illustrated in FIG. 20.

In the roads in FIG. 20, when the vehicle is traveling on the road link L1, there is little change in traffic volume since the road link L1 has no branch road (intersection), and the host vehicle is expected to travel by a predetermined distance for a predetermined time.

Meanwhile, other vehicles may enter the road link L2 from the road links L3 and L4 on the road link L2 across the branch road (intersection). In this case, the traffic volume changes greatly on the road link L2, and the host vehicle is expected to fail to travel a predetermined distance for a predetermined time.

Incidentally, when the road links L1 and L2 are trunk roads and the road links L3 and L4 are roads such as alleys, it is considered that there are few other vehicles entering the road link L2 from the road links L3 and L4. In this case, the road link L2 may also be predicted as a road with little change in traffic volume.

Here, the following (1) to (3) are examples of roads with little change in traffic volume.

(1) A case where traffic flow does not change since there is no road that cuts into a road where the host vehicle is traveling based on map data or there is no shopping center or the like which may cause a traffic jam.

(2) A case where real-time traffic information is acquired from VICS (registered trademark) or road traffic census and it is determined that traffic flow does not change based on the traffic information.

(3) A case where it is determined that traffic flow does not change based on road information transmitted from a data center.

In Step S104, the motion control device 3 acquires traffic information on the host vehicle planned travel road (the road link L2), adjacent to the road (the road link L1) on which the host vehicle is currently traveling, using the road information acquisition device 20 as illustrated in FIG. 20(a).

The motion control device 3 acquires an average vehicle speed, a travel time, and the like of the vehicle on the road (the road link L2) via equipment such as VICS (registered trademark) and an optical beacon. In addition, information acquired by a vehicle (for example, a probe car) provided with a communication terminal may be acquired via the data center 900.

Since these pieces of traffic information can be measured in real time, the measurement accuracy is high. As a result, when these pieces of traffic information can be obtained, the motion control device 3 utilizes these pieces of traffic information to determine the traffic volume change position. However, it is difficult to acquire traffic information in real time on a road where such equipment is not installed. Therefore, the motion control device 3 acquires offline information obtained by a traffic volume investigation or the like.

In the traffic information obtained by the traffic volume investigation, a traffic volume for each time unit at an observation point is recorded.

However, it is difficult to observe the traffic volume at all intersections, and thus, intersections with large changes in traffic volume are mainly focused. As a result, a road link for which a traffic volume has not been observed is regarded as a section to be estimated, and the traffic volume is calculated based on road information on which the observation has been performed.

As illustrated in FIG. 20(b), when it is determined in Step S103 that there is no host vehicle planned travel route (Step S103: No), traffic information on all the road links (L2, L3, and L4) adjacent to the road link L1 on which the host vehicle is currently traveling is acquired in Step S105.

Next, when real-time information on the traffic volume of the road link L1 on which the host vehicle is currently traveling and the acquired traffic volumes of the adjacent road links L2, L3, and L4 has been acquired, the motion control device 3 compares the acquired traffic volumes in Step S106.

Here, when there is no host vehicle planned travel route and there are the plurality of road links L2, L3, and L4 adjacent to the road link L1 as illustrated in FIG. 20(b), the motion control device 3 compares the traffic volume for each road link (between L1 and L2, between L1 and L3, and between L1 and L4).

In this manner, the motion control device 3 compares the traffic volume for each road link in Step S106, and determines that there is a traffic volume change position at the next branch road (intersection: node) while the host vehicle is traveling on the road link L1, for example, when the road links L1 and L2 have no traffic volume change and the road links L1 and L3 have a traffic volume change, and determines not to perform (to prohibit) acceleration/deceleration suppression control.

Then, when the host vehicle actually travels on the road link L2 (a planned travel route is confirmed), the motion control device 3 can utilize information on travel distance up to the previous time that there is no change in traffic volume on the road link L1 and road link L2, and thus, can increase an application range of the acceleration/deceleration suppression control by performing (permitting) the acceleration/deceleration suppression control.

When the change in traffic volume is equal to or greater than a predetermined value, the motion control device 3 determines the branch point (intersection: node) connecting such road links as the traffic volume change position, and outputs a travel distance from a current position to a position of the node as a travel distance up to the traffic volume change position. Here, a reason why not a change rate of traffic volume for each road link but the change amount is compared in the embodiment is because a traffic volume is generally the number of vehicles passing per unit time and a proportional relationship is established between the change amount in traffic volume and the change amount in travel distance.

Meanwhile, when it is difficult to obtain any one or both of the traffic volume of the road link on which the host vehicle is currently traveling and the traffic volume of the adjacent road link, the comparison between the traffic volumes is performed based on the offline information obtained by the traffic volume investigation or the like. For example, when a road is set as a section to be estimated, it is determined that a change in the traffic volume is little, and it is determined that it is not a traffic volume change position. In addition, when the change in traffic volume is equal to or greater than a predetermined value, a node connecting road links where the change in traffic volume is equal to or greater than the predetermined value is determined as the traffic volume change position, and a travel distance from a current position to a position of the node is output as a travel distance up to the traffic volume change position.

Further, when it is difficult to acquire any of real-time traffic information such as VICS (registered trademark) and offline traffic information such as traffic volume investigation, the motion control device 3 may determine the traffic volume change position using basic road information (map information) in Step S106.

Specifically, there is a possibility that the traffic volume may change due to a junction or a branch road (including an intersection), and an increase or a decrease in road width or the number of lanes, a change of a road type (for example, a main road, a city road, and an alley), presence or absence of a right or left turn lane, and the like, and thus, a node point may be determined from such information, and this node point may be used as the traffic volume change position in Step S106. As a result, it becomes possible to optimize the application range of the acceleration/deceleration suppression control.

Next, the travel distance acquisition unit 31 of the motion control device 3 selects an object for which a travel distance is to be acquired based on the calculation result of the traffic volume change position calculation unit 36.

In the motion control device 2 of the second embodiment described above, not only the travel distance from the set vehicle speed state (the stop state in the embodiment) to the next set vehicle speed state (the stop state in the embodiment) of the host vehicle but also the travel distance of the forward vehicle of the host vehicle including the preceding vehicle is also acquired in the same manner based on the information of the forward recognition sensor 134 and the communication device 18.

However, when all the travel distances of the preceding vehicles including the host vehicle are acquired, a communication load increases as a result of an increase in communication data so that there is a possibility that it is difficult to acquire the travel distance in real time.

Therefore, the information on forward vehicles existing between the current position of the host vehicle and the traffic volume change position calculated by the traffic volume change position calculation unit 36 is acquired in the motion control device 3 of the third embodiment. As a result, communication data can be reduced and the communication load can be mitigated.

The travel distance storage unit 32 selects an object for which a travel distance from the set vehicle speed state (the stop state in the embodiment) to the next set vehicle speed state (the stop state in the embodiment) of the preceding vehicle ahead of the host vehicle including the host vehicle is to be stored based on the calculation result of the traffic volume change position calculation unit 36.

In the second embodiment, the travel distance storage unit 22 gives priority to the latest new information, and preferentially stores the information on the preceding vehicle that is closer to the host vehicle ahead of the host vehicle. For this reason, there is a possibility that it is difficult to store effective vehicle information depending on a vacant state of the storage capacity of the travel distance storage unit 22. Therefore, the travel distance storage unit 32 preferentially stores information on the forward vehicle existing between the current position of the host vehicle and the traffic volume change position obtained by the traffic volume change position calculation unit 36 in the third embodiment. Since the vehicle information prior to the traffic volume change position is excluded in this manner, it is possible to appropriately store the effective vehicle information while reducing the storage capacity of the travel distance storage unit 32. Thus, the prediction accuracy of the travel distance can be improved.

The acceleration/deceleration control unit 35 determines whether to perform the acceleration/deceleration suppression control based on the calculation result of the traffic volume change position calculation unit 36, the prediction value of the next travel distance, and the preceding vehicle information.

A specific determination method will be described with reference to FIG. 21.

Figure 21:
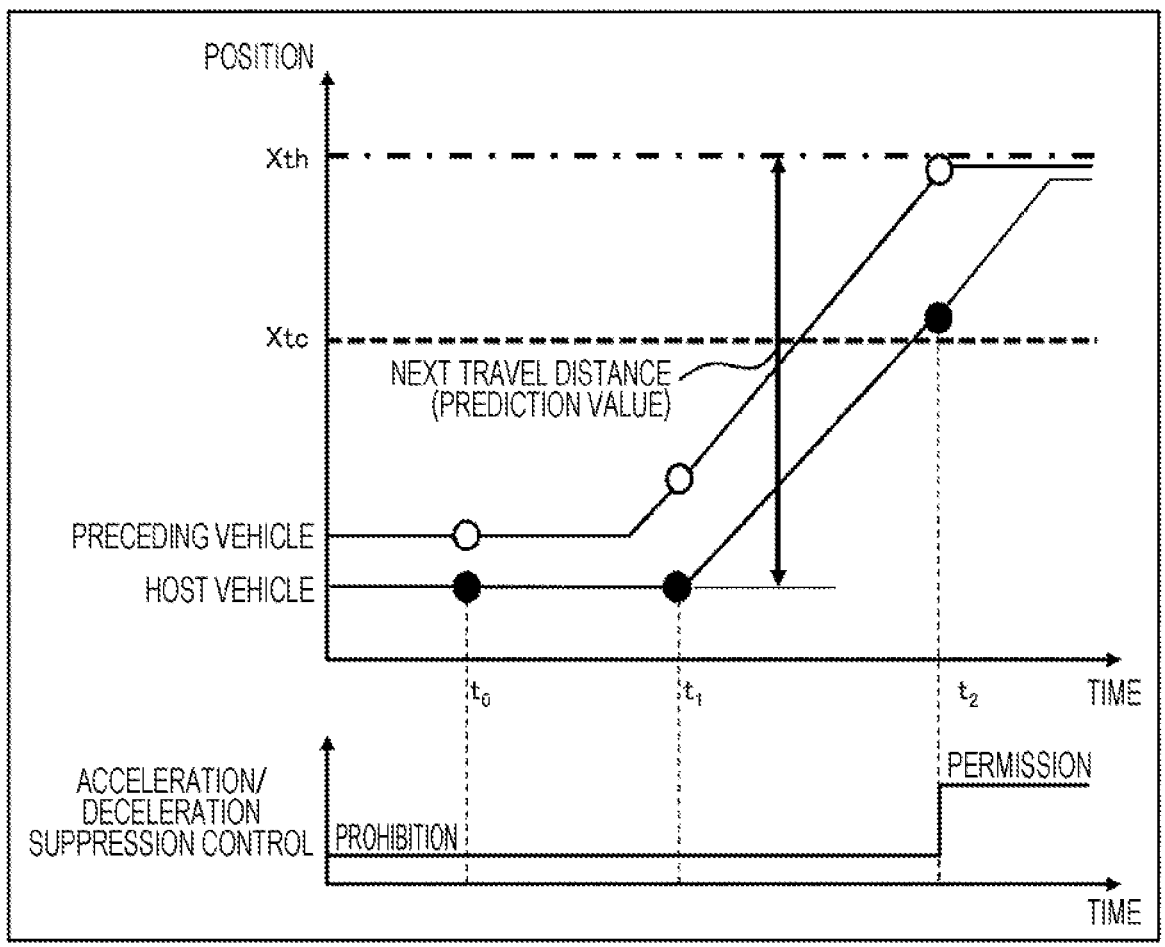
FIG. 21 is a graph for describing an example of prohibition determination or permission determination of acceleration/deceleration suppression control of the vehicle performed by a control determination unit according to the third embodiment.

FIG. 21 is a graph for describing an example of prohibition determination or permission determination of acceleration/deceleration suppression control of the vehicle 300 performed by the control determination unit 14 according to the third embodiment. In FIG. 21, the horizontal axis represents time and the vertical axis represents a position.

As illustrated in FIG. 21, both the host vehicle and the preceding vehicle are in a stop state at time t0. At time t1, an arrival position Xth to permit the acceleration/deceleration suppression control is set from a calculated prediction value of the next travel distance (an arrow in FIG. 21) and a current position.

In the motion control device 3 of the third embodiment, processing to prohibit the acceleration/deceleration suppression control is performed when a traffic volume change position Xtc obtained by the traffic volume change position calculation unit 36 is closer to the current position than the arrival position Xth to permit the acceleration/deceleration suppression control. As a result, it is possible to suppress malfunctions of low fuel consumption control under a situation where there is the traffic volume is likely to change, and a sense of discomfort for a driver can be reduced.

However, there is a case where the traffic volume change position Xtc is not a position where the traffic volume changes when the planned travel route is confirmed as described above (the position of the preceding vehicle at time t2 does not exceed the arrival position Xth to permit the acceleration/deceleration suppression control). Therefore, if it is determined that the traffic volume does not change when the host vehicle passes the traffic volume change position Xtc (time t2), the acceleration/deceleration suppression control is permitted from that time. As a result, the acceleration/deceleration suppression control utilizing the prediction value of the next travel distance can be executed even in a situation where the host vehicle passes a position where the traffic volume changes so that the fuel consumption can be improved.

Fourth Embodiment

Next, a motion control device 4 according to a fourth embodiment will be described.

This motion control device 4 is also mounted on a vehicle (not illustrated) and used for control of a motion of the vehicle.

Figure 22:
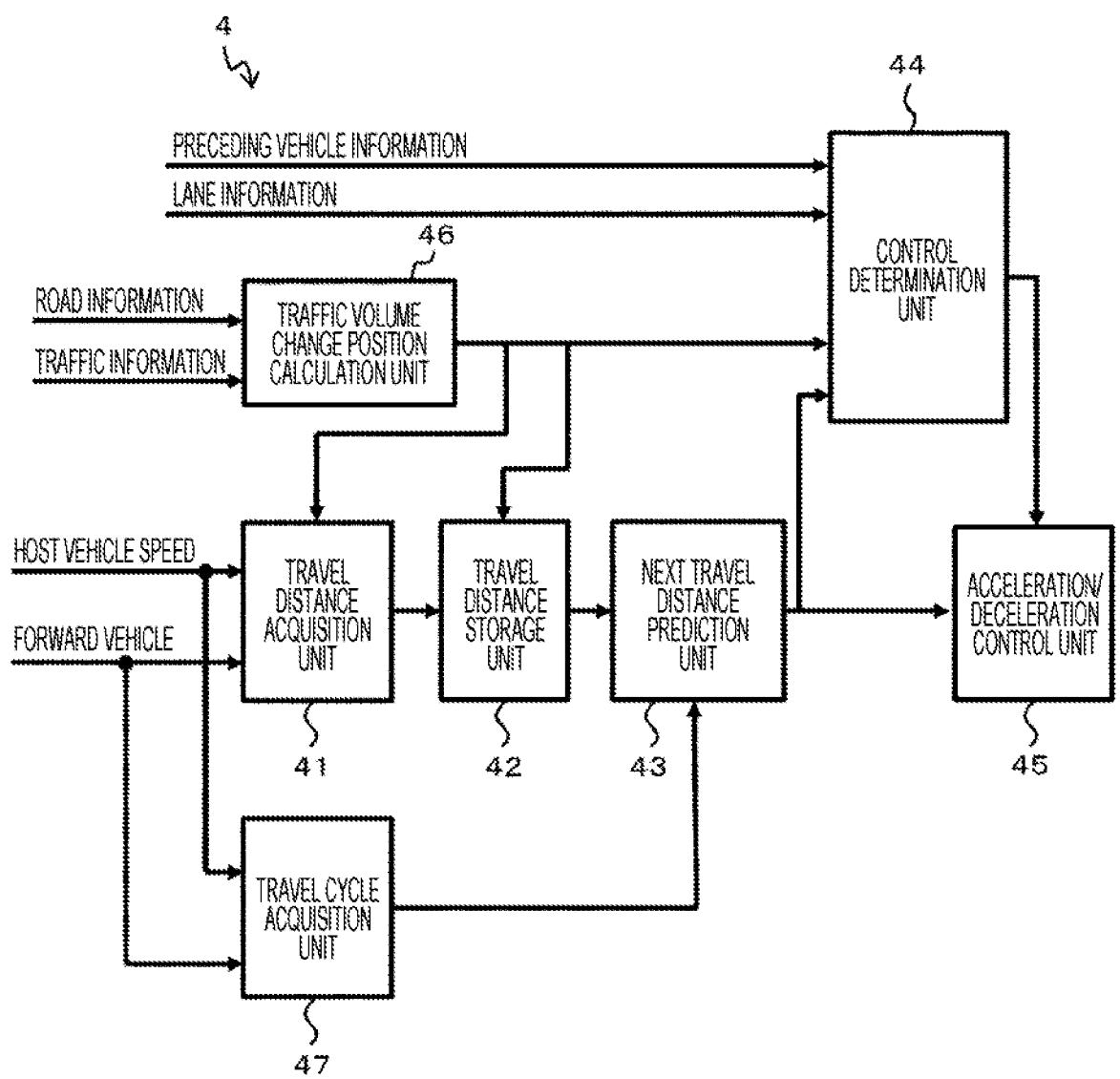
FIG. 22 is a functional block diagram of a motion control device according to a fourth embodiment.

FIG. 22 is a functional block diagram of the motion control device 4 according to the fourth embodiment.

As illustrated in FIG. 22, the motion control device 4 includes a travel distance acquisition unit 41, a travel distance storage unit 42, a next travel distance prediction unit 43, a control determination unit 44, an acceleration/deceleration control unit 45, a traffic volume change position calculation unit 46, and a travel cycle acquisition unit 47, and is different from the motion control device 3 according to the above-described embodiment in terms that a prediction result in the next travel distance prediction unit 43 is changed even based on a travel cycle acquired by the travel cycle acquisition unit 47. Other configurations and functions are the same as the respective configurations 31, 32, 33, 34, 35, and 36 of the motion control device 3 according to the above-described embodiment, and thus, will be described as necessary.

A specific processing method of the next travel distance prediction unit 43 in the motion control device 4 according to the fourth embodiment will be described with reference to FIG. 23.

Figure 23:
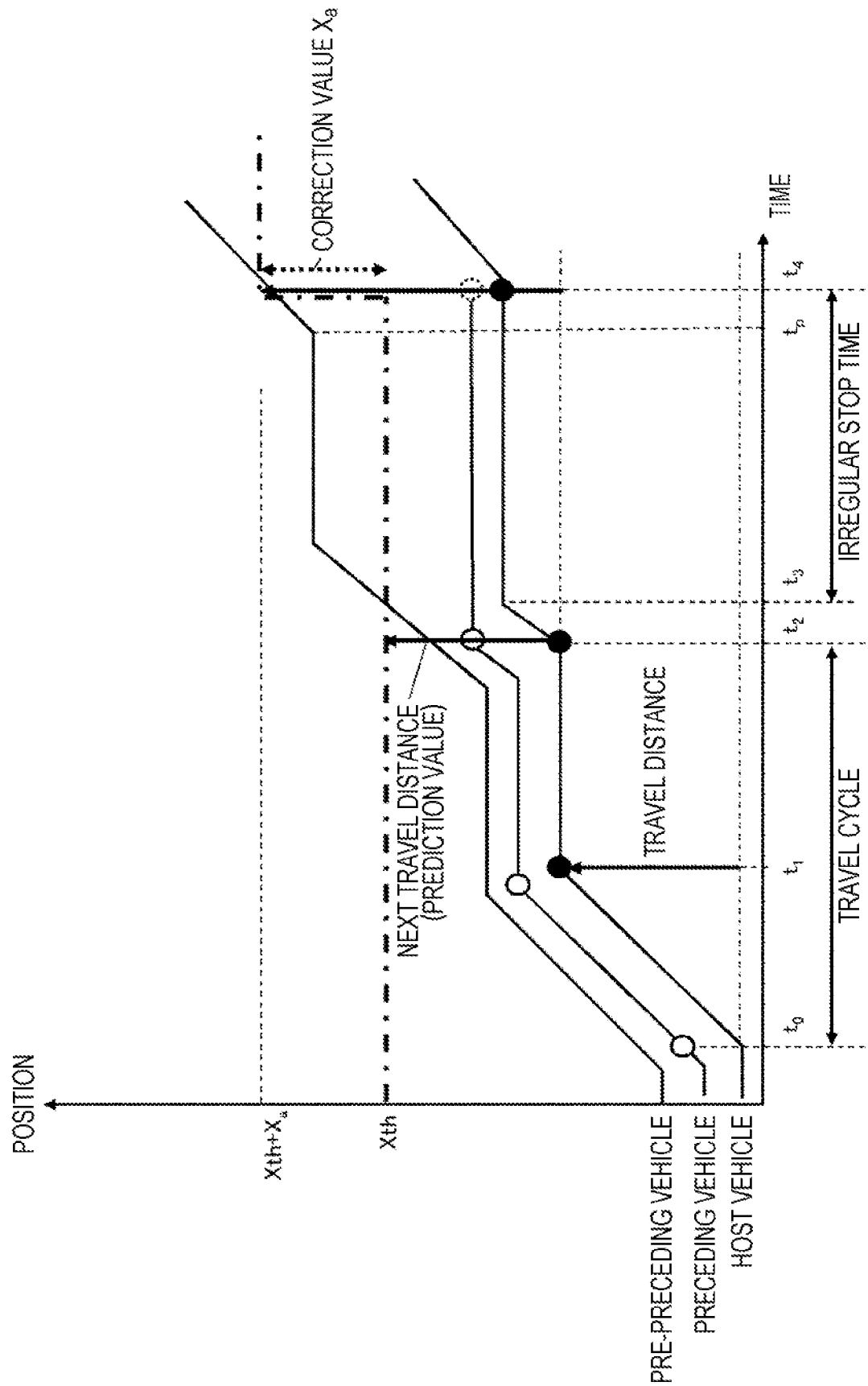
FIG. 23 is a graph illustrating a specific processing method of a next travel distance prediction unit in the motion control device.

FIG. 23 is a graph illustrating the specific processing method of the next travel distance prediction unit 43 in the motion control device 4. In FIG. 23, the horizontal axis represents time and the vertical axis represents a position.

As illustrated in FIG. 23, a host vehicle starts to travel following a preceding vehicle at time t0. At time t1, the host vehicle stops following the preceding vehicle. The next travel distance prediction unit 43 records a travel distance at this time, and sets this travel distance as a prediction value of the next travel distance when the host vehicle starts next time (time t2).

Further, the travel cycle acquisition unit 47 records a time (t2-t0) for which the host vehicle starts traveling (time t0) and then enters a stop state (time t1), and the host vehicle restarts next time (time t2) as a travel cycle. This travel cycle is the same cycle as a previous travel cycle when the traffic volume does not change.

Thus, in the next travel distance prediction unit 43, it is possible to correct the next travel distance in a case where an irregular stop occurs by using the travel cycle (t2-t0) acquired by the travel cycle acquisition unit 47

Specifically, an irregular stop time (time t3 to t4) occurs if the host vehicle immediately stops when the preceding vehicle leaves a road (for example, turns right or left to enter a store or a parking lot) after starting. In particular, when the preceding vehicle crosses an opposing road having an opposite lane, this stop time (t3 to t4) becomes longer.

Thereafter, if the irregular stop time (t4-t3) is shorter than the travel cycle (t2-t0) when the preceding vehicle leaves the road (time t4), the next travel distance does not change. On the other hand, when the irregular stop time (t4-t3) is longer than the travel cycle (t2-t0) as illustrated in FIG. 23, a pre-preceding vehicle shifts to the next traveling cycle and starts acceleration at time tp.

As a result, an inter-vehicle distance between the host vehicle and the pre-preceding vehicle increases, and thus, it is necessary to increase the acceleration of the host vehicle to quickly follow the pre-preceding vehicle.

Therefore, a correction Xa of the next travel distance is required. Here, a correction value of the next travel distance can be calculated by the following Formula 10.

$$X_a = \begin{cases} 0 & \ldots (t_4 - t_3) \le (t_2 - t_0) \\ X_{th} \times \dfrac{(t_4 - t_3)}{(t_2 - t_0)} & \ldots (t_4 - t_3) > (t_2 - t_0) \end{cases} \quad \text{[Formula 10]}$$

As a result, the next travel distance can be predicted with high accuracy even after the irregular stop occurs.

Although the description has been given in the above-described embodiments by exemplifying the case where the moving body is the vehicle, the invention is not limited to the case where the moving body is the vehicle. For example, it is sufficient for the moving body to be movable manually or automatically, and a construction machine, a robot, an unmanned aircraft, a drone, or the like may be used, and the motion control device according to the present invention can be applied.

In addition, these moving bodies may be either manned or unmanned, and may use an electric power source or an internal combustion engine such as an engine as a power source.

In addition, the present invention may appropriately combine any of the configurations of the first embodiment to the fourth embodiment described above or may combine the configurations of all the embodiments.

In addition, the present invention is not limited to one having all the configurations of the embodiments described above. Some configurations of the embodiment described above may be replaced with configurations of another embodiment, and further, the configurations of the embodiment described above may be replaced with configurations of another embodiment.

In addition, some configurations of the embodiment described above may be added to, deleted from, or replaced with configurations of another embodiment.

In addition, a part or all of each of the configurations, functions, processes, and means of the above embodiments may be realized, for example, by hardware by designing with an integrated circuit and the like. In addition, the configurations and functions described above may be realized by execution of a program in which a processor realizes each function.

Information such as the program can be stored in a storage device such as a memory.

REFERENCE SIGNS LIST 1, 2, 3, 4 motion control device
11, 21, 31, 41 travel distance acquisition unit 12, 22, 32, 42 travel distance storage unit
13, 23, 33, 43 next travel distance prediction unit
14, 24, 34, 44 control determination unit
15, 25, 35, 45 acceleration/deceleration control unit
151 vehicle speed maintenance control unit
152 inter-vehicle distance maintenance control unit
153 acceleration/deceleration suppression control unit
154 target acceleration selection unit
155 target braking/driving force calculation unit
16 notification determination unit
17 driving assistance function unit
18 communication device
19 GPS sensor
20 road information acquisition device
36, 46 traffic volume change position calculation unit
47 travel cycle acquisition unit
100, 200, 300, 400 vehicle
110 engine
111 brake
112 transmission
113 clutch
114 wheel
115 differential mechanism
116 power generator
120 shift control device
121 brake control device
122 engine control device
131 vehicle speed sensor
134 forward recognition sensor
900 data center

The invention claimed is:

1. A motion control device for a moving body, the motion control device configured to control a motion of a moving body, comprising:
a movement distance acquisition unit which acquires a first movement distance of the moving body from a first motion state to the next first motion state of the moving body;
a movement distance storage unit which stores the first movement distance; a movement distance prediction unit which predicts a second movement distance;
a control determination unit which determines whether to perform control to suppress acceleration/deceleration in a movement direction of the moving body;
an acceleration/deceleration control unit which controls acceleration/deceleration of the moving body, wherein
the acceleration/deceleration control unit performs control of the acceleration/deceleration in the movement direction of the moving body based on a determination result on whether to suppress the acceleration/deceleration of the moving body performed by the control determination unit and the second movement distance predicted by the movement distance prediction unit,
the first motion state is a state where the moving body is stopped or is moving at a low speed of lower than 20 km/h;
a preceding vehicle information acquisition unit which acquires a relative distance between the moving body and a preceding moving body preceding the moving body; and
a moving body position acquisition unit which acquires a current position of the moving body, wherein
the control determination unit prohibits the control to suppress the acceleration/deceleration of the moving body when the relative distance between the moving body and the preceding moving body becomes longer than a relative distance between the current position of the moving body and a position obtained from the second movement distance predicted by the movement distance prediction unit,
the acceleration/deceleration control unit decreases an upper limit acceleration when accelerating the moving body such that the speed of the moving body is reduced when the moving body reaches a point where lower fuel consumption is preferred, while the second movement distance predicted by the movement distance prediction unit decreases,
the second movement distance is a distance of the moving body from the first motion state to the next first motion state of the moving body after having moved by the first movement distance based on the first movement distance stored in the movement distance storage unit, and
the acceleration/deceleration control unit is configured to calculate a boundary line at which to switch to the lower fuel consumption using a first acceleration and a second acceleration, wherein the first acceleration is an acceleration during which driving energy does not contribute to an increase in kinetic energy, and the second acceleration during engine braking when fuel is not consumed.

2. The motion control device for a moving body according to claim 1, wherein
the acceleration/deceleration control unit stops supply of energy to power to move the moving body and controls a position to start deceleration of the moving body based on the second movement distance predicted by the movement distance prediction unit.

3. The motion control device for a moving body according to claim 1, wherein
the acceleration/deceleration control unit decreases an upper limit movement speed of the moving body, as the second movement distance predicted by the movement distance prediction unit decreases.

4. The motion control device for a moving body according to claim 1, further comprising:
a communication device capable of communicating with other moving bodies around the moving body, a route information device installed in a movement route of the moving body, and a data center having information including route information;
a position information acquisition unit which acquires current position information of the moving body; and
a moving body information acquisition unit which acquires movement speeds and positions of other moving bodies preceding the moving body in the movement direction in the movement route,
wherein the movement distance storage unit preferentially stores the newest first movement distance and information on another moving body closest to the current position of the moving body in the movement direction of the moving body.

5. The motion control device for a moving body according to claim 1, further comprising:
a communication device capable of communicating with other moving bodies around the moving body, a route information device installed in a movement route of the moving body, and a data center having information including route information;
a position information acquisition unit which acquires current position information of the moving body; and
a moving body information acquisition unit which acquires movement speeds and positions of other moving bodies preceding the moving body in the movement direction in the movement route, wherein the movement distance prediction unit changes the first movement distance to a third movement distance when acquiring the third movement distance of a preceding moving body from the first motion state to the next first motion state of the preceding moving body preceding the moving body in the movement direction before the moving body reaches a position calculated based on the second movement distance.

6. The motion control device for a moving body according to claim 1, further comprising:
a communication device capable of communicating with other moving bodies around the moving body, a route information device installed in a movement route of the moving body, and a data center having information including route information;
a position information acquisition unit which acquires current position information of the moving body;
a moving body information acquisition unit which acquires movement speeds and positions of other moving bodies preceding the moving body in the movement direction in the movement route;
a traffic volume acquisition device which acquires a traffic volume of other preceding moving bodies around the current position of the moving body; and
a traffic volume change position calculation unit which calculates a change position of the traffic volume,
wherein the movement distance storage unit preferentially stores a travel distance of another preceding moving body existing between the current position of the moving body acquired by the position information acquisition unit and the traffic volume change position calculated by the traffic volume change position calculation unit.

7. The motion control device for a moving body according to claim 1, further comprising:
a communication device capable of communicating with other moving bodies around the moving body, a route information device installed in a movement route of the moving body, and a data center having information including route information;
a position information acquisition unit which acquires current position information of the moving body;
a moving body information acquisition unit which acquires movement speeds and positions of other moving bodies preceding the moving body in the movement direction in the movement route;
a traffic volume acquisition device which acquires a traffic volume of other preceding moving bodies around the current position of the moving body; and
a traffic volume change position calculation unit which calculates a change position of the traffic volume,
wherein the control determination unit permits control to suppress acceleration/deceleration of the moving body when a difference between the current position of the moving body and the traffic volume change position calculated by the traffic volume change position calculation unit is larger than a difference between the current position of the moving body acquired by the position information acquisition unit and a position calculated based on the second movement distance predicted by the movement distance prediction unit.

8. The motion control device for a moving body according to claim 7, wherein
the traffic volume change position calculation unit calculates a difference between a traffic volume on a first route on which the moving body is currently moving and a traffic volume on a second route adjacent to the first route, the traffic volumes acquired by the traffic volume acquisition device, and sets a position where the first route and the second route intersect each other as the traffic amount change position when the difference is greater than or equal to a predetermined value.

9. The motion control device for a moving body according to claim 7, wherein
time for the temporary stop of the moving body is defined as a time for which the moving body has been temporarily stopped at a given position that is different from the position calculated by the traffic volume change position calculation unit.

10. The motion control device for a moving body according to claim 1, wherein
the movement distance prediction unit corrects the second movement distance based on a temporary stop time and a travel cycle of the moving body when the moving body is temporarily stopped.

11. The motion control device for a moving body according to claim 10, wherein
the travel cycle of the moving body is defined as a cycle of time including a start of movement of the moving body, a temporary stop of the moving body, and a restart of movement of the moving body.

12. The motion control device for a moving body according to claim 1, wherein the acceleration/deceleration control unit includes
input/output ports that communicate with various control devices including the motion control device, and
an analog to digital converter that takes both a vehicle speed measured by a vehicle speed sensor and a measurement value of an air flow meter which measures an amount of air taken into the engine.

13. A motion control device for a moving body, the motion control device configured to control a motion of a moving body, comprising:
a movement distance acquisition unit which acquires a first movement distance of the moving body from a first motion state to the next first motion state of the moving body;
a movement distance storage unit which stores the first movement distance;
a movement distance prediction unit which predicts a second movement distance;
a notification determination unit which determines whether to inform suppression of acceleration/deceleration in a movement direction of the moving body;
a driving assistance function unit which informs the suppression of acceleration/deceleration in the movement direction of the moving body based on a determination result on whether to inform the suppression of acceleration/deceleration of the moving body performed by the notification determination unit and the second movement distance predicted by the movement distance prediction unit, wherein
the first motion state is a state where the moving body is stopped or is moving at a low speed of lower than 20 km/h;
a preceding vehicle information acquisition unit which acquires a relative distance between the moving body and a preceding moving body preceding the moving body;
a moving body position acquisition unit which acquires a current position of the moving body;
a control determination unit configured to prohibit the control to suppress the acceleration/deceleration of the moving body when the relative distance between the moving body and the preceding moving body becomes longer than a relative distance between the current position of the moving body and a position obtained from the second movement distance predicted by the movement distance prediction unit;

the acceleration/deceleration control unit decreases an upper limit acceleration when accelerating the moving body such that the speed of the moving body is reduced when the moving body reaches a point where lower fuel consumption is preferred, while the second movement distance predicted by the movement distance prediction unit decreases, the second movement distance is a distance of the moving body from the first motion state to the next first motion state of the moving body after having moved by the first movement distance based on the first movement distance stored in the movement distance storage unit, and the acceleration/deceleration control unit is configured to calculate a boundary line at which to switch to the lower fuel consumption using a first acceleration and a second acceleration, wherein the first acceleration is an acceleration during which driving energy does not contribute to an increase in kinetic energy, and the second acceleration during engine braking when fuel is not consumed.

* * * * *